(12) United States Patent
Kato et al.

(10) Patent No.: US 10,379,336 B2
(45) Date of Patent: Aug. 13, 2019

(54) IMAGE GENERATING APPARATUS AND IMAGE GENERATING METHOD

(71) Applicant: Panasonic Intellectual Property Management Co., Ltd., Osaka (JP)

(72) Inventors: Yumiko Kato, Osaka (JP); Yoshihide Sawada, Tokyo (JP); Yasuhiro Mukaigawa, Nara (JP); Takuya Funatomi, Nara (JP); Hiroyuki Kubo, Nara (JP); Fusataka Kuniyoshi, Okinawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 73 days.

(21) Appl. No.: 15/868,580

(22) Filed: Jan. 11, 2018

(65) Prior Publication Data

US 2018/0210185 A1    Jul. 26, 2018

(30) Foreign Application Priority Data

Jan. 24, 2017    (JP) .................................. 2017-010655

(51) Int. Cl.
*G06K 9/00* (2006.01)
*G02B 21/36* (2006.01)
*G02B 21/06* (2006.01)
*G06T 7/73* (2017.01)
(Continued)

(52) U.S. Cl.
CPC ....... *G02B 21/365* (2013.01); *G02B 21/0008* (2013.01); *G02B 21/06* (2013.01);
(Continued)

(58) Field of Classification Search
CPC .. G02B 21/365; G02B 21/06; G06K 9/00134; G06K 9/0014; G06K 9/00147;
(Continued)

(56) References Cited

U.S. PATENT DOCUMENTS 6,088,025 A * 7/2000 Akamine .............. G06F 1/1626
                                                     345/104
6,405,929 B1 * 6/2002 Ehrhart ..................... A63F 3/06
                                                     235/486

(Continued)

FOREIGN PATENT DOCUMENTS

JP    2010-019762    1/2010
WO    2014/196203    12/2014

*Primary Examiner* — Amir Alavi
(74) *Attorney, Agent, or Firm* — Wenderoth, Lind & Ponack, L.L.P.

(57) ABSTRACT

An image generating apparatus is provided with a first light source and a second light source, an image sensor, a mask including a light-transmitting part and a light-blocking part, and a dark image processing unit. The image sensor acquires a first image of the material when illuminated by the first light source, and acquires a second image of the material when illuminated by the second light source. The image sensor includes a first pixel region and a second pixel region. The light-blocking part is positioned between the first pixel region and the first light source. The light-blocking part is positioned between the first pixel region and the first light source. The dark image processing unit uses first pixel information corresponding to a first pixel region in the first image and second pixel information corresponding to a second pixel region in the second image to generate a third image.

8 Claims, 32 Drawing Sheets

(51) Int. Cl.
*G06T 7/00* (2017.01)
*G02B 21/00* (2006.01)
*G06K 9/20* (2006.01)
*G06K 9/62* (2006.01)

(52) U.S. Cl.
CPC ......... *G02B 21/367* (2013.01); *G06K 9/0014* (2013.01); *G06K 9/00134* (2013.01); *G06K 9/00147* (2013.01); *G06K 9/2027* (2013.01); *G06T 7/0012* (2013.01); *G06T 7/73* (2017.01); *G06K 9/6223* (2013.01); *G06T 2207/10056* (2013.01); *G06T 2207/30024* (2013.01); *G06T 2207/30044* (2013.01); *G06T 2207/30242* (2013.01)

(58) Field of Classification Search
CPC ............ G06T 2207/30242; G06T 7/73; G06T 2207/10056; G06T 2207/30024; G06T 2207/30044; G06T 7/0012
See application file for complete search history.

(56) References Cited

U.S. PATENT DOCUMENTS

| | | | | |
|---|---|---|---|---|
| 6,654,097 | B1* | 11/2003 | Nishi | G03F 7/70358 |
| | | | | 355/53 |
| 6,967,752 | B1* | 11/2005 | Katakura | H04N 1/407 |
| | | | | 348/96 |
| 7,385,710 | B1* | 6/2008 | Sturgill | G01B 11/06 |
| | | | | 356/632 |
| 8,836,672 | B2* | 9/2014 | Stienstra | G06F 3/0421 |
| | | | | 345/175 |
| 9,915,621 | B2* | 3/2018 | Foad | G01N 21/95 |
| 2011/0032502 | A1* | 2/2011 | Nomura | G01J 4/04 |
| | | | | 355/71 |
| 2014/0133702 | A1 | 5/2014 | Zheng et al. | |
| 2015/0172575 | A1 | 6/2015 | Adachi et al. | |
| 2018/0025475 | A1* | 1/2018 | Kato | G02B 21/06 |
| | | | | 348/241 |
| 2018/0210185 | A1* | 7/2018 | Kato | G06K 9/2027 |
| 2018/0255240 | A1* | 9/2018 | Kato | H04N 5/23232 |

* cited by examiner

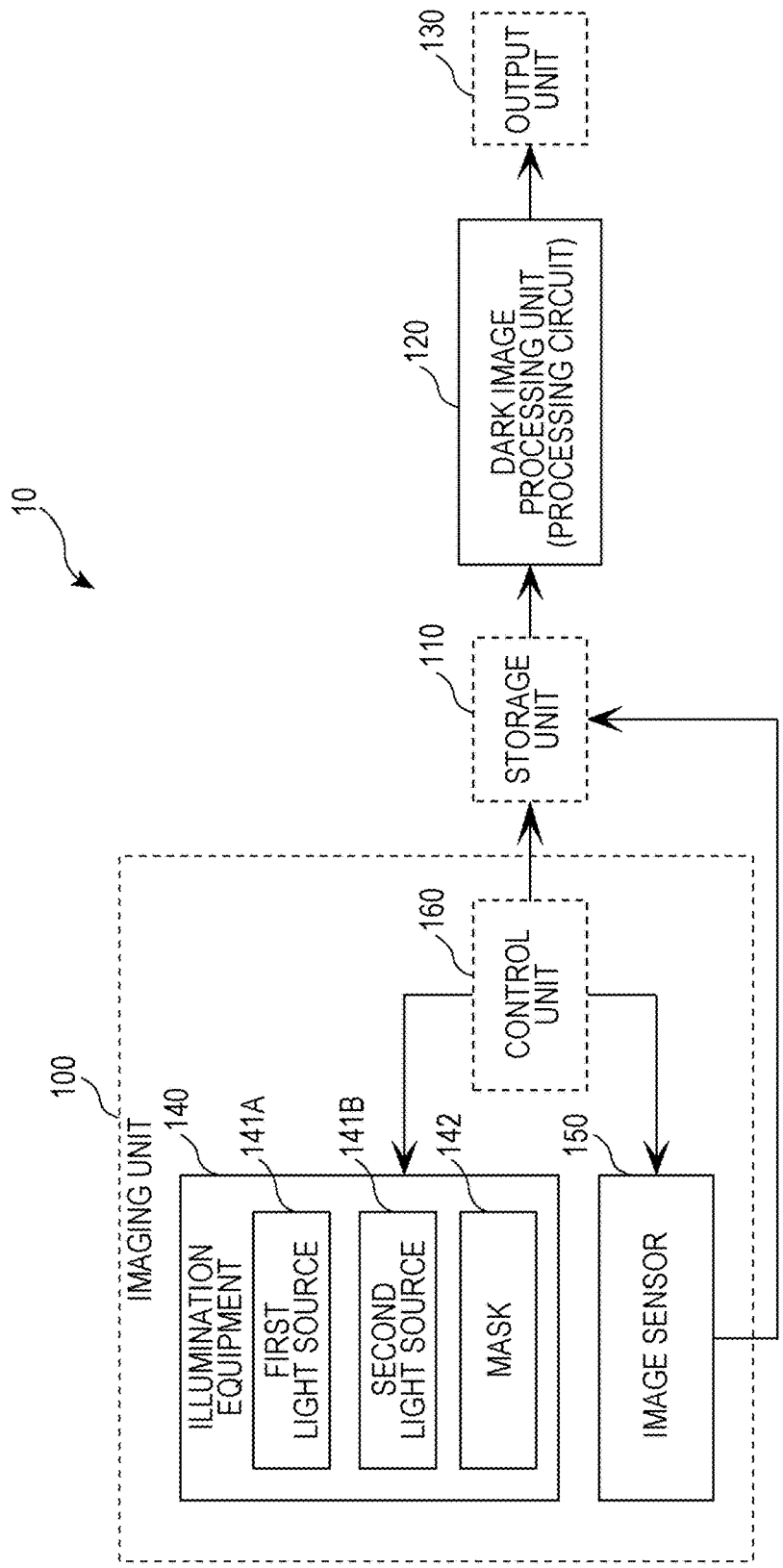

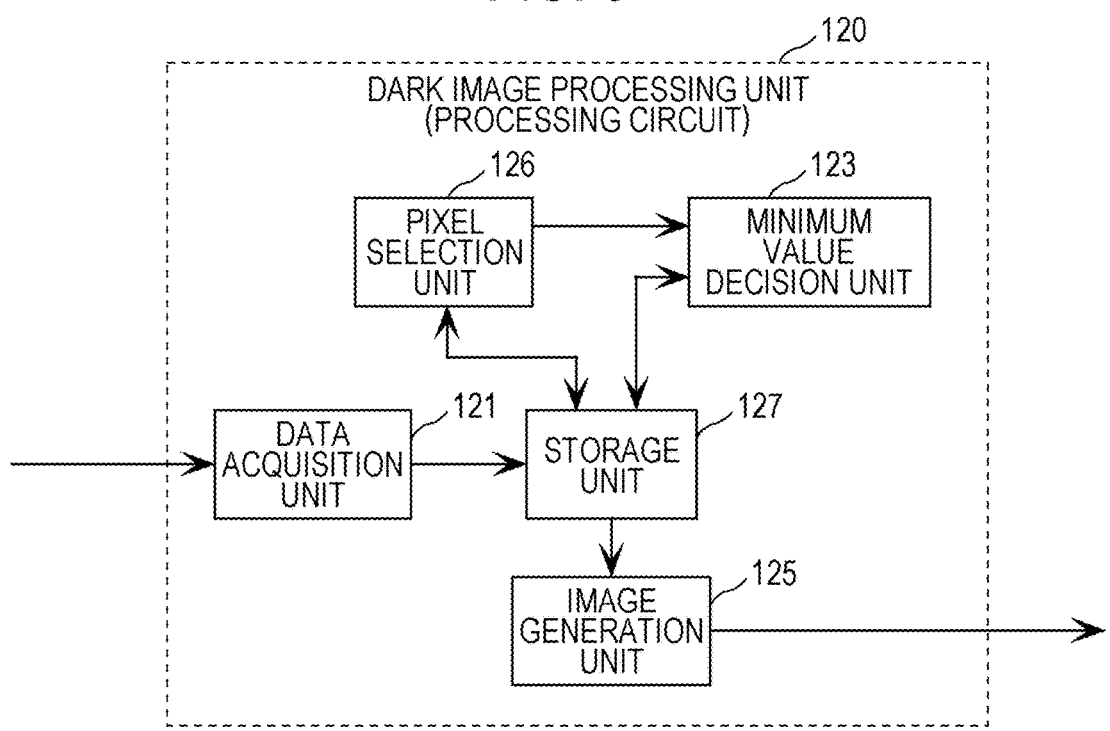

| PIXEL POSITION | ILLUMINATION POSITION |
|---|---|
| ⋮ | ⋮ |
| (1830, 1472) | (1, 380) |
|  | (1, 1140) |
|  | (1, 1880) |
|  | ⋮ |
|  | (4181, 1140) |
|  | (4181, 1880) |
|  | ⋮ |
| (1830, 1473) | (1, 390) |
| ⋮ | ⋮ |

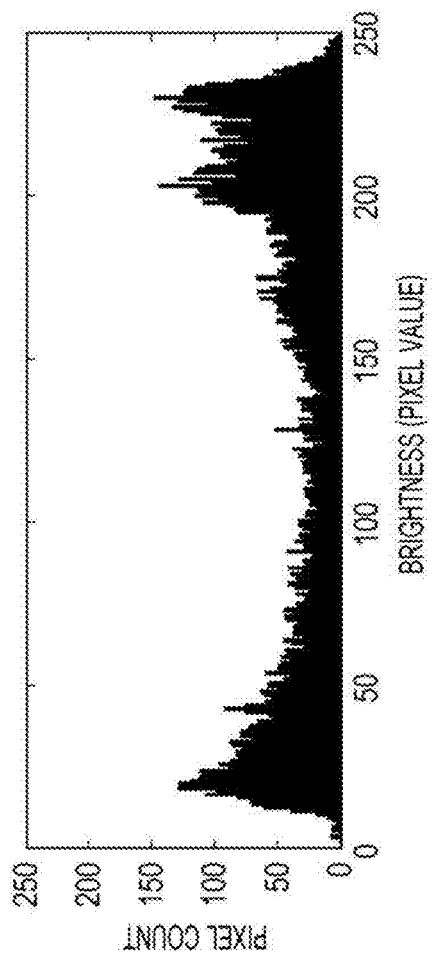
FIG. 17B
FIG. 17A
CAPTURE IMAGE BY LENSLESS POINT LIGHT SOURCE OF RELATED ART
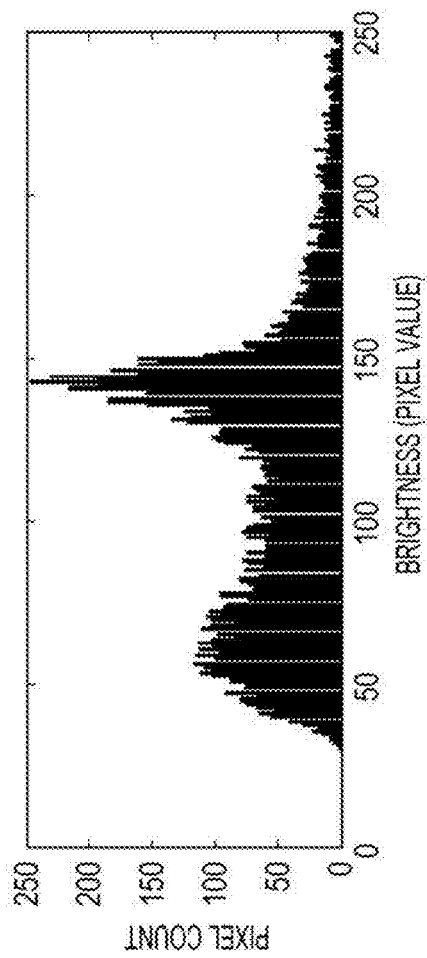
FIG. 17D
FIG. 17C
DARK IMAGE ACCORDING TO PRESENT EMBODIMENT

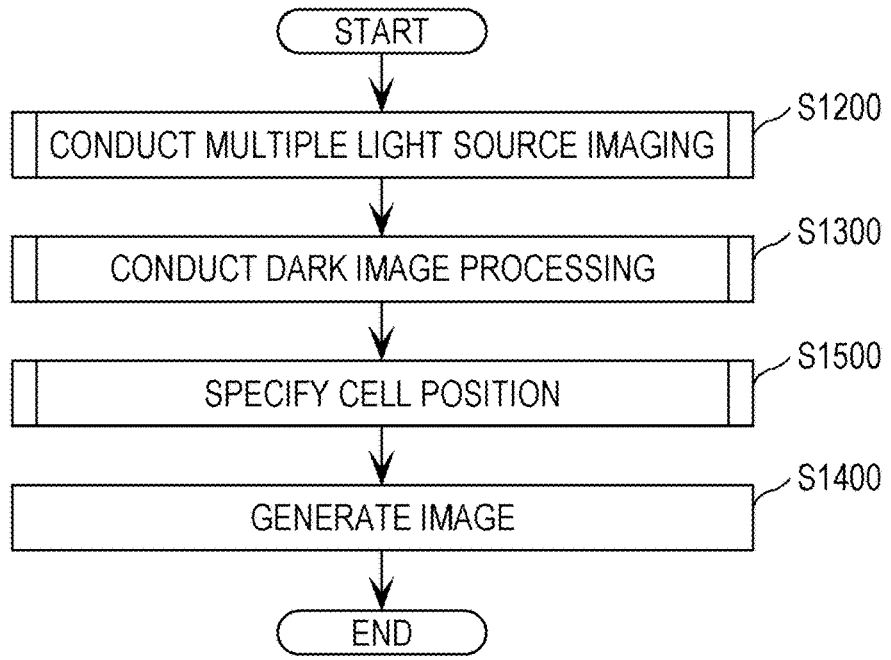
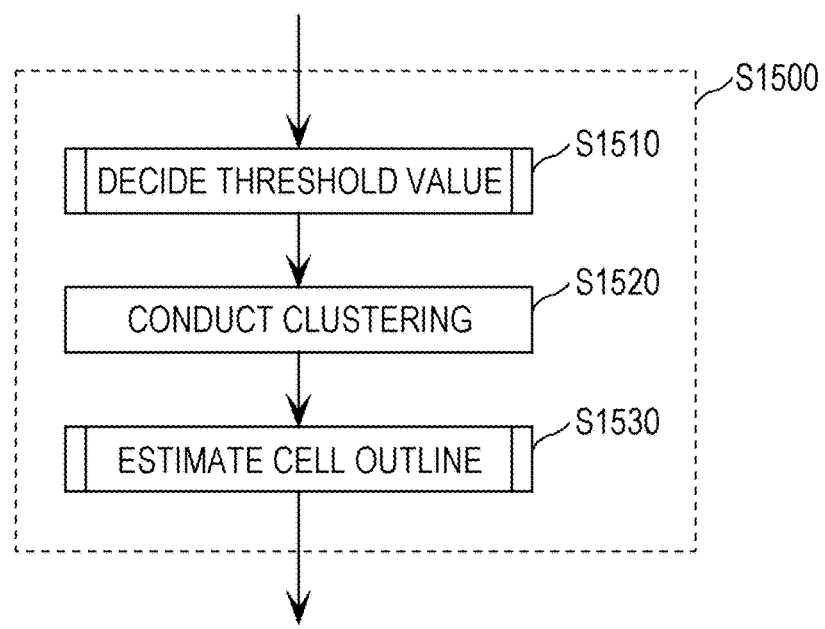

CENTERS OF GRAVITY FOR CLUSTERS

ESTIMATED OUTLINES

DARK IMAGE

SET OF PIXELS TARGETED FOR CLUSTERING

CLUSTERING RESULT

IMAGE GENERATING APPARATUS AND IMAGE GENERATING METHOD

BACKGROUND

1. Technical Field

The present disclosure relates to an image generating apparatus that generates images, such as a lensless microscope, for example, and to an image generating method.

2. Description of the Related Art

Demand to observe cultured cells continuously without staining exists in the cultivation of cells for medical use and in testing for drug efficacy, as well as in many fields that use cultured cells for medical or industrial applications. However, since many cells are nearly colorless and transparent, observation is difficult because of the low contrast when imaging with an optical microscope using transmitted light. One factor for the low contrast is the scattering or refraction of light due to the medium around the subject to be imaged and the subject itself.

Japanese Patent No. 5403458 illustrates a method of removing a noise component of reflected light from the brightness of two light and dark states, namely a state of radiation from an optical beam, and a state in which the radiation is stopped.

Also, Japanese Patent No. 5789766 illustrates a method of realizing a dark field scope with a wide field of view by imaging using illumination having a light and dark pattern, in order to observe a transparent object. U.S. Patent Application Publication No. 2014/0133702 illustrates a method of discriminating between live and dead cells with an image obtained with dark field illumination.

Meanwhile, continuous observation of cultured cells is conducted in the limited space of an incubator for maintaining a humid environment to cultivate cells. For such observation in a limited space, Japanese Patent No. 5789766 and U.S. Patent Application Publication No. 2014/0133702 disclose a lensless microscope enabling observation of tiny cells without using a lens. In the above literature, a high-resolution image is generated by using multiple images taken with illumination radiated from multiple different positions.

SUMMARY

However, a problem with the method of Japanese Patent No. 5403458 is that the apparatus becomes more bulky. In other words, with this method, collimated light and a digital micro-mirror device are used in an apparatus that records the brightness of reflected light from illumination, and measures the asperities on the object surface. Additionally, by computing the relative brightness from the difference between the brightness recorded by radiating a first light and dark pattern and the brightness recorded by radiating a second light and dark pattern, the brightness at individual positions of the objective lens is compared more easily. However, if one attempts to extend the light and dark pattern over the entire image sensor, a lens becomes necessary, and the apparatus becomes more bulky. On the other hand, in the case of taking images with multiple light sources as in Japanese Patent No. 5789766 and U.S. Patent Application Publication No. 2014/0133702, it may be necessary to change the position of the illumination. When taking images while changing the positions of the light source and the digital micro-mirror device, since the apparatus is bulky, it is difficult to combine a lensless microscope with light and dark inversion by the digital micro-mirror device.

One non-limiting and exemplary embodiment provides an image generating apparatus and an image generating method capable of generating images in which the state of a material can be understood easily with a less bulky apparatus.

In one general aspect, the techniques disclosed here feature an image generating apparatus that generates an image of a translucent material, comprising: a first light source; a second light source positioned a certain distance away from the first light source; an image sensor on which the material is disposed; a mask including a light-transmitting part that transmits light from the first light source and the second light source, and a light-blocking part that blocks the light, the mask being positioned between the image sensor, and the first light source and the second light source; and a processing circuit, wherein the image sensor acquires a first image of the material when illuminated by the first light source, acquires a second image of the material when illuminated by the second light source, the image sensor includes a first pixel region and a second pixel region, the light-blocking part is positioned between the first pixel region and the first light source, the light-blocking part is positioned between the second pixel region and the second light source, the processing circuit uses first pixel information corresponding to the first pixel region in the first image and second pixel information corresponding to the second pixel region in the second image to generate a third image.

It should be noted that general or specific embodiments may be implemented as a method, an integrated circuit, a computer program, a non-transitory computer-readable recording medium, or any selective combination thereof. Computer-readable recording media include non-volatile recording media such as Compact Disc-Read-Only Memory (CD-ROM), for example.

According to the present disclosure, it is possible to generate images in which the state of a material can be understood easily with a less bulky apparatus. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a block diagram illustrating an example of a functional configuration of an image generating apparatus according to Embodiment 1;

FIG. 8 is a diagram illustrating an example of content stored by a storage unit according to Embodiment 1;

FIG. 9 is a block diagram illustrating an example of a functional configuration of a dark image processing unit according to Embodiment 1;

FIGS. 17A and 17C are diagrams illustrating a comparison between a dark image according to Embodiment 1, and an image of the related art;

FIGS. 17B and 17D are histograms relating to the dark image according to Embodiment 1 and the image of the related art;

FIG. 20 is a flowchart illustrating an example of the operation of an image generating apparatus according to Embodiment 2;

FIG. 21 is a flowchart illustrating an example of the operation of the cell position specification unit according to Embodiment 2;

DETAILED DESCRIPTION

Figure 1A:
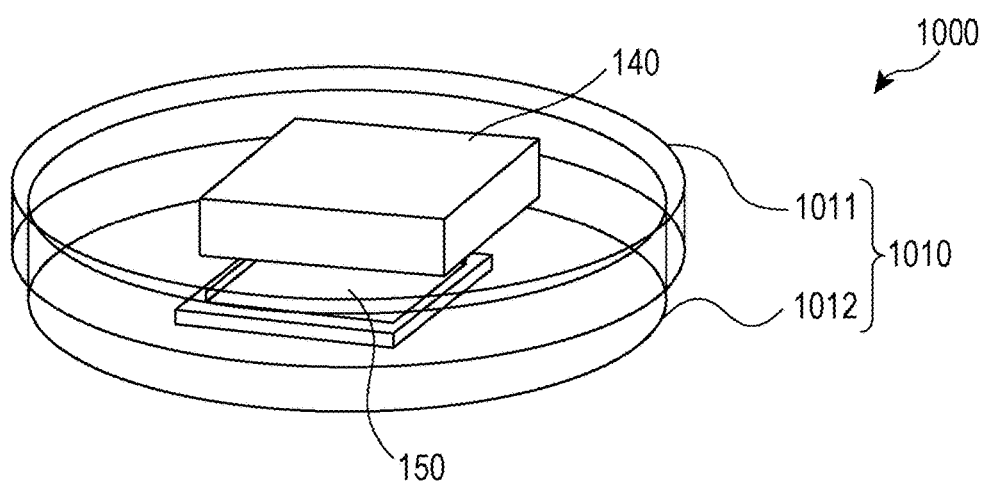
FIG. 1A is a perspective view of a cell culture container according to Embodiment 1.

An image generating apparatus according to one aspect of the present disclosure is an image generating apparatus that generates an image of a translucent material, comprising: a first light source; a second light source positioned a certain distance away from the first light source; an image sensor on which the material is disposed; a mask including a light-transmitting part that transmits light from the first light source and the second light source, and a light-blocking part that blocks the light, the mask being positioned between the image sensor, and the first light source and the second light source; and a processing circuit. The image sensor acquires a first image of the material when illuminated by the first light source, and acquires a second image of the material when illuminated by the second light source. The image sensor includes a first pixel region and a second pixel region. The light-blocking part is positioned between the first pixel region and the first light source, and the light-blocking part is positioned between the second pixel region and the second light source. The processing circuit uses first pixel information corresponding to the first pixel region in the first image and second pixel information corresponding to the second pixel region in the second image to generate a third image.

With this arrangement, a first image and a second image are acquired, and a third image is generated by using first pixel information corresponding to a first pixel region in the first image, and second pixel information corresponding to a second pixel region in the second image. Herein, the first pixel information corresponding to the first pixel region of the image sensor is the brightness obtained by the first pixel region in a state in which direct light from the first light source is blocked, and indicates the brightness due to only scattered light or refracted light from the material. Similarly, the second pixel information corresponding to the second pixel region of the image sensor is the brightness obtained by the second pixel region in a state in which direct light from the second light source is blocked, and indicates the brightness due to only scattered light or refracted light from the material. Consequently, the third image generated as described above is expressed by the brightness due to only scattered light or refracted light from the material. As a result, a clear image containing much information about intermediate brightness due to scattered light or refracted light, excluding direct light, can be generated as the dark image.

In other words, in a lensless imaging system in which a material is placed on an image sensor and imaged using transmitted light, images taken in the dark state among the two states of light and dark can be used to generate an image in which the positions of cells included in the material are easily visible due to scattered light, for example.

Also, since it is sufficient to simply switch the light source illuminating the material in order to acquire a first image and a second image with different light and dark patterns, it is not necessary to change the positions of structures such as a light source of a digital micro-mirror device, for example, and the apparatus as a whole may be miniaturized.

Consequently, it is possible to generate images in which the state of a material such as cells can be understood easily with a less bulky apparatus.

In another possible configuration, the material is an embryo including a cell, and the processing circuit specifies a region having a brightness equal to or greater than a first threshold value in the third image as a region where the cell is positioned. For example, the processing circuit may use the third image and the region where the cell is positioned to generate a fourth image emphasizing the region where the cell is positioned.

With this arrangement, the position of a cell included in an embryo treated as the material can be displayed in a more easily understandable way.

In another possible configuration, the material is an embryo including multiple cells, and the processing circuit
(a1) extracts multiple cell regions having a brightness equal to or greater than a first threshold value in the third image,
(a2) determines whether or not the brightness of each of the multiple cells regions is within a second range, and
(a3) outputs the determination result.
For example, in (a3), the processing circuit outputs a determination result indicating that the multiple cells are normal in a case in which the brightness of each of the multiple cell regions is within the second region, and outputs a determination result indicating that the multiple cells are abnormal in a case in which the brightness of each of the multiple cell regions is outside the second region.

With this arrangement, since the brightness of a cell region corresponding to a cell in the third image is different depending on the amount of fine structures included in the cell, it is possible to appropriately determine whether or not a cell is abnormal according to whether or not the brightness is within a second range.

In another possible configuration, the material is an embryo including a cell, and the processing circuit
(b1) extracts a cell region having a brightness equal to or greater than a first threshold value in the third image, and
(b2) computes a density of the cell on a basis of the brightness of the cell region.

With this arrangement, since the brightness of a cell region corresponding to a cell in the third image is different depending on the amount of fine structures included in the cell, or in other words, the density of the cell, it is possible to appropriately compute the density of the cell on the basis of the brightness.

Note that these general or specific aspects may also be realized by an apparatus, method, integrated circuit, computer program, a computer-readable recording medium such as a CD-ROM disc, or any selective combination thereof.

Hereinafter, an image generating apparatus and an image generating method according to a mode of the present disclosure will be described specifically with reference to the drawings.

Note that the exemplary embodiments described hereinafter all illustrate general or specific examples. Features such as numerical values, shapes, structural elements, layout positions and connection states of structural elements, steps, and the ordering of steps indicated in the following exemplary embodiments are merely examples, and are not intended to limit the scope of the claims. In addition, among the structural elements in the following exemplary embodiments, structural elements that are not described in the independent claim indicating the broadest concept are described as arbitrary or optional structural elements.

Embodiment 1

An image generating apparatus according to Embodiment 1 is provided with: illumination equipment made up of multiple point light sources and a mask in which are created a light-transmitting part that transmits light and a light-blocking part that blocks light, such as stripes or a checker pattern; an image sensor; and a processing circuit. In the illumination equipment, the multiple point light sources at different positions successively illuminate an object (that is, a material) positioned on top of the image sensor. At this time, the image sensor images the object while light and dark patterns of the light reaching the image sensor and the object are switched. As a result, multiple images with different light and dark patterns are acquired. For each pixel of the image sensor, the processing circuit extracts the pixel of lowest brightness (the dark of the light and dark patterns) from among multiple images, and generates an image.

At this point, the image generating apparatus according to Embodiment 1 images cells in a mixture contained in a cell culture container as the object, for example. First, the cell culture container and the like will be described in detail. Note that the object of imaging in the present embodiment is cells, for example. The object may also be a material other than cells, insofar as the material is translucent.

[1. Structure of Cell Culture Container]

Figure 1B:
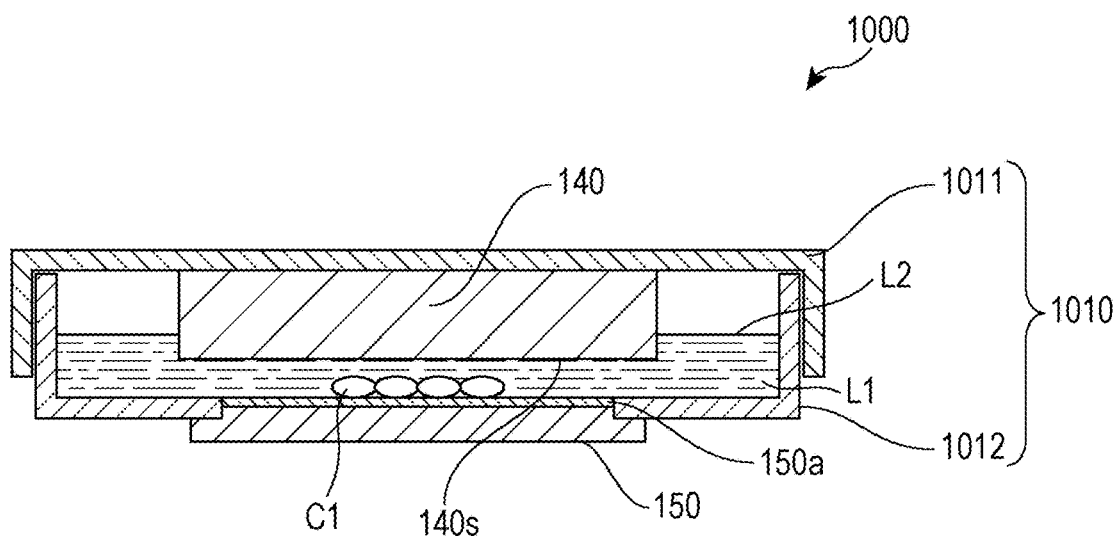
FIG. 1B is a cross-section view of a cell culture container according to Embodiment 1.

FIG. 1A is a perspective view of a dish cell culture container 1000 according to Embodiment 1. FIG. 1B is a cross-section view of a dish cell culture container 1000 according to Embodiment 1. As illustrated in FIGS. 1A and 1B, the dish cell culture container 1000 is provided with a container unit 1010, illumination equipment 140, and an image sensor 150. Note that the dish cell culture container 1000 illustrated in FIGS. 1A and 1B is a dish-shaped container called a laboratory dish or a Petri dish, but may also be horizontal flask-shaped container.

The container unit 1010 is a container that holds a mixture including cells and a culture liquid. In other words, the container unit 1010 is a container inside of which the mixture is positioned. The container unit 1010 is a transparent container made of glass or plastic, and is provided with a lid part 1011 and a main part 1012.

The main part 1012 is a cylinder that prescribes the bottom and the sides of the container unit 1010. The main part 1012 includes a bottom face and a side face, and has an opening on top.

The lid part 1011 is a bottomed cylindrical member that closes off the opening in the main part 1012 by being fitted onto the main part 1012. The lid part 1011 forms the top part of the container unit 1010.

The illumination equipment 140 is provided on the inner face of the lid part 1011, and radiates light onto the mixture inside the container unit 1010. As a result, the radiated light passes through the mixture, and is output as transmitted light. In other words, transmitted light refers to light that has been transmitted through the mixture from the illumination equipment 140, and is light that has been refracted and attenuated by the semitransparent material of the mixture. Specifically, the illumination equipment 140 is affixed to the inner face of the lid part 1011, and radiates light from above onto the mixture inside the container unit 1010. Note that the illumination equipment 140 may also be affixed to the outer face of the lid part 1011.

Also, in the present embodiment, the illumination equipment 140 projects from the top part of the container unit 1010 into the interior of the container unit 1010, and a light-emitting face 140s of the illumination equipment 140 is positioned inside the mixture that includes cells C1 and culture liquid L1 inside the container unit 1010. In other words, the light-emitting face 140s of the illumination equipment 140 is positioned below the liquid face L2 of the mixture, and above the bottom of the container unit 1010.

The image sensor 150 is provided on the bottom of the container unit 1010, and receives transmitted light output from the mixture. The image sensor 150 is a solid-state image sensor such as a charge-coupled device (CCD) image sensor or a complementary metal-oxide semiconductor (CMOS) image sensor, for example. In the image sensor 150, multiple pixels are arranged in a matrix layout. Light radiated from the illumination equipment 140 is incident on each pixel of the image sensor 150. By being irradiated with light, the image sensor 150 takes an optical image of the cells formed on the photosensitive surface of the image sensor 150.

Specifically, as illustrated in FIG. 1B, the image sensor 150 is fitted into an opening formed in the bottom of the container unit 1010. The photosensitive surface of the image sensor 150, which is covered by a transparent protective film 150a, is exposed to the space inside the container unit 1010. The cells C1 sink to the bottom of the culture liquid L1 which fills the container unit 1010, and are cultivated in a state of direct contact on top of the transparent protective film 150a. As illustrated in FIG. 1B, a condensing lens does not exist between the cells C1 and the image sensor 150.

In this way, the cells C1 which are the object of imaging are cultivated while being placed on top of the photosensitive surface of the image sensor 150 through the transparent protective film 150a.

[2. Configuration of Image Generating Apparatus]

FIG. 2 is a function block diagram of an image generating apparatus 10 according to Embodiment 1. The image generating apparatus 10 illustrated in FIGS. 1A and 1B is an apparatus that generates images of translucent material such as cells, and is provided with an imaging unit 100, a storage unit 110, a dark image processing unit 120, and an output unit 130.

[2-1. Imaging Unit]

First, the configuration of the imaging unit 100 will be described. The imaging unit 100 is provided with illumination equipment 140, an image sensor 150, and a control unit 160. The imaging unit 100 acquires a photographic image of a material treated as the object. Herein, the imaging unit 100 does not include a focus lens. Note that although the image generating apparatus 10 according to Embodiment 1 is provided with the control unit 160, the storage unit 110, and the output unit 130, these structural elements are not required, and the image generating apparatus 10 may also not be provided with these structural elements.

The illumination equipment 140 in Embodiment 1 is provided with a first light source 141A, a second light source 141B, and a mask 142. The first light source 141A is a point light source that illuminates the material. The second light source 141B is a point light source that illuminates the material from a position separated from the first light source 141A by a certain distance. The mask 142 includes a light-transmitting part that transmits light from the first light source 141A and the second light source 141B, as well as a light-blocking part that blocks such light. The mask 142 is positioned between the image sensor 150, and the first light source 141A and the second light source 141B. Note that the example of the certain distance described above is the distance corresponding to ⅓ or ⅔ of the period described later.

Hereinafter, the illumination equipment 140 will be described in detail.

Figure 3:
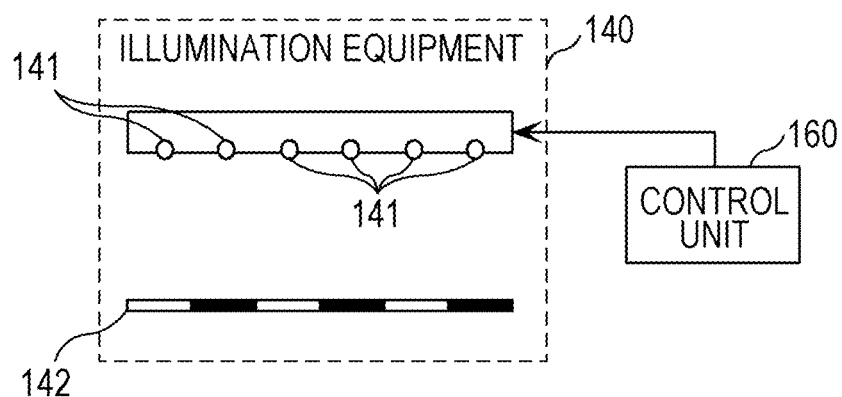
FIG. 3 is a diagram that schematically illustrates the structure of illumination equipment according to Embodiment 1.

FIG. 3 is a diagram that schematically illustrates the structure of the illumination equipment 140 in Embodiment 1. Specifically, the illumination equipment 140 is provided with multiple point light sources 141, including the first light source 141A and the second light source 141B discussed above, and the mask 142. The mask 142 includes stripes or a checker pattern. In other words, the mask 142 includes a light-transmitting part that transmits light, and a light-blocking part that blocks light.

Figure 4:
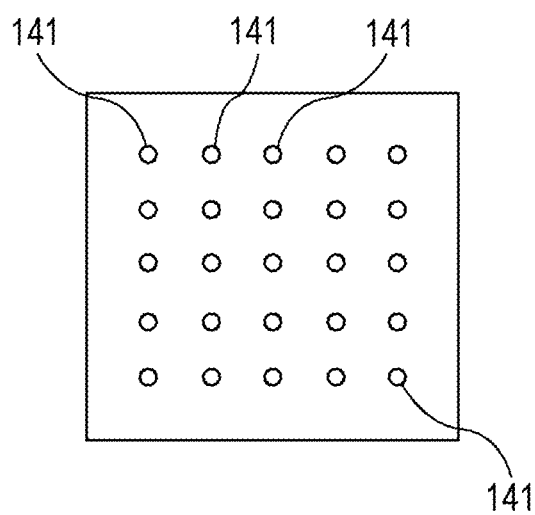
FIG. 4 is a diagram that schematically illustrates an example of multiple point light sources according to Embodiment 1.

FIG. 4 is a schematic diagram that illustrates an example of the arrangement of the multiple point light sources 141. In the example of FIG. 4, the multiple point light sources 141 are arrayed at equal intervals. Each of the multiple point light sources 141 has a light-emitting face that emits light, for example, and is attached to a light-shielding plate corresponding to the mask 142. The light-shielding plate has multiple pinholes corresponding to the light-transmitting part of the mask 142. The multiple point light sources 141 are positioned so that the light-emitting faces of the point light sources 141 are exposed through the multiple pinholes. Light output from each light-emitting face spreads out uniformly in all directions, centered on each point light source 141. One example of the size of a light-emitting face is a diameter of 10 μm, while one example of the size of a pinhole is also a diameter of 10 μm.

Figure 5A:
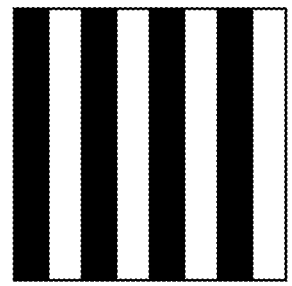
FIGS. 5A and 5B are diagrams that schematically illustrate the structure of a mask according to Embodiment 1.
Figure 5B:
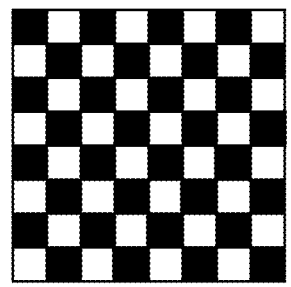

FIGS. 5A and 5B illustrate an example of the mask 142. Specifically, FIG. 5A illustrates an example of a mask 142 having stripes, while FIG. 5B illustrates an example of a mask 142 having a checker pattern. Note that the black portions in FIGS. 5A and 5B indicate the light-blocking part discussed earlier, whereas the white portions indicate the light-transmitting part discussed earlier. In the example of FIG. 5A, the stripes of the light-blocking part indicated by the black lines are the same width as the stripes of the light-transmitting part indicated by the white lines. Also, in the checker pattern of FIG. 5B, the black squares indicating the light-blocking part are the same size as the white squares indicating the light-transmitting part. Also, the multiple light-transmitting parts and the multiple light-blocking parts are set at equal intervals on the mask 142. In other words, the multiple light-transmitting parts and the multiple light-blocking parts of the mask 142 are arranged periodically and regularly. Also, the widths of the lines in the stripes or the lengths of one side of the squares in the checker pattern are set so that part of the object becomes bright due to the light beam passing through the mask 142 from some of the point light sources 141, while the remaining part becomes dark. In other words, the widths or the lengths of one side of the squares discussed above are set so that the light and dark pattern of the light on the object and the image sensor 150 due to the light beam divides the object into at least two regions (a bright region and a dark region). For example, if the object is 100 μm, the widths of the lines in the stripes or the lengths of one side of the squares are 30 μm, for example. The mask 142 is realized by vapor deposition of metal on glass, for example.

Figure 6:
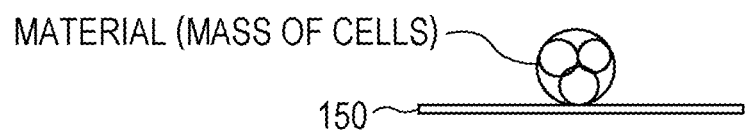
FIG. 6 is a schematic diagram explaining the positional relationship between an image sensor and an object according to Embodiment 1.

FIG. 6 is an example of an object placed on top of the image sensor 150. Note that in FIG. 6, elements such as the transparent protective film 150a are omitted. The object to be imaged is placed directly on top of the image sensor 150. The object is multiple semitransparent materials, for example. The multiple materials are stacked on top of each other in three dimensions. A specific example of the material is cells or cultured cells. In the example of FIG. 6, the object is an early embryo.

The image sensor 150 includes multiple pixels, on which is placed the material discussed above. The pixels of the image sensor 150 are disposed on a photosensitive surface, and acquire the intensity of light (in other words, brightness values) of light radiated from the multiple point light sources 141. The image sensor 150 acquires a photographic image on the basis of the intensity of light acquired by each of the pixels. In other words, the image sensor 150 acquires a first image of the material when illuminated by the first light source 141A from among the multiple point light sources 141, and acquires a second image of the material when illuminated by the second light source 141B from among the multiple point light sources 141.

Examples of the image sensor 150 include a complementary metal-oxide semiconductor (CMOS) image sensor and a charge-coupled device (CCD) image sensor.

The multiple point light sources 141 of the illumination equipment 140 radiate light one after another. The multiple point light sources 141 are arranged at mutually different positions, and radiate light onto the object through the mask 142 from mutually different directions.

The control unit 160 controls the radiation of light by the multiple point light sources 141, and the imaging by the image sensor 150. Specifically, the control unit 160 controls the order in which the multiple point light sources 141 radiate light, and the time intervals over which the multiple point light sources 141 radiate light. The control unit 160 is realized by a computer system (not illustrated) made up of components such as a central processing unit (CPU), random access memory (RAM), and read-only memory (ROM). Some or all of the functions of the structural elements of the control unit 160 may also be achieved by having the CPU execute a program recorded in the ROM, using the RAM as a working memory. Additionally, some or all of the functions of the structural elements of the control unit 160 may also be achieved by a specialized hardware circuit.

Figure 7:
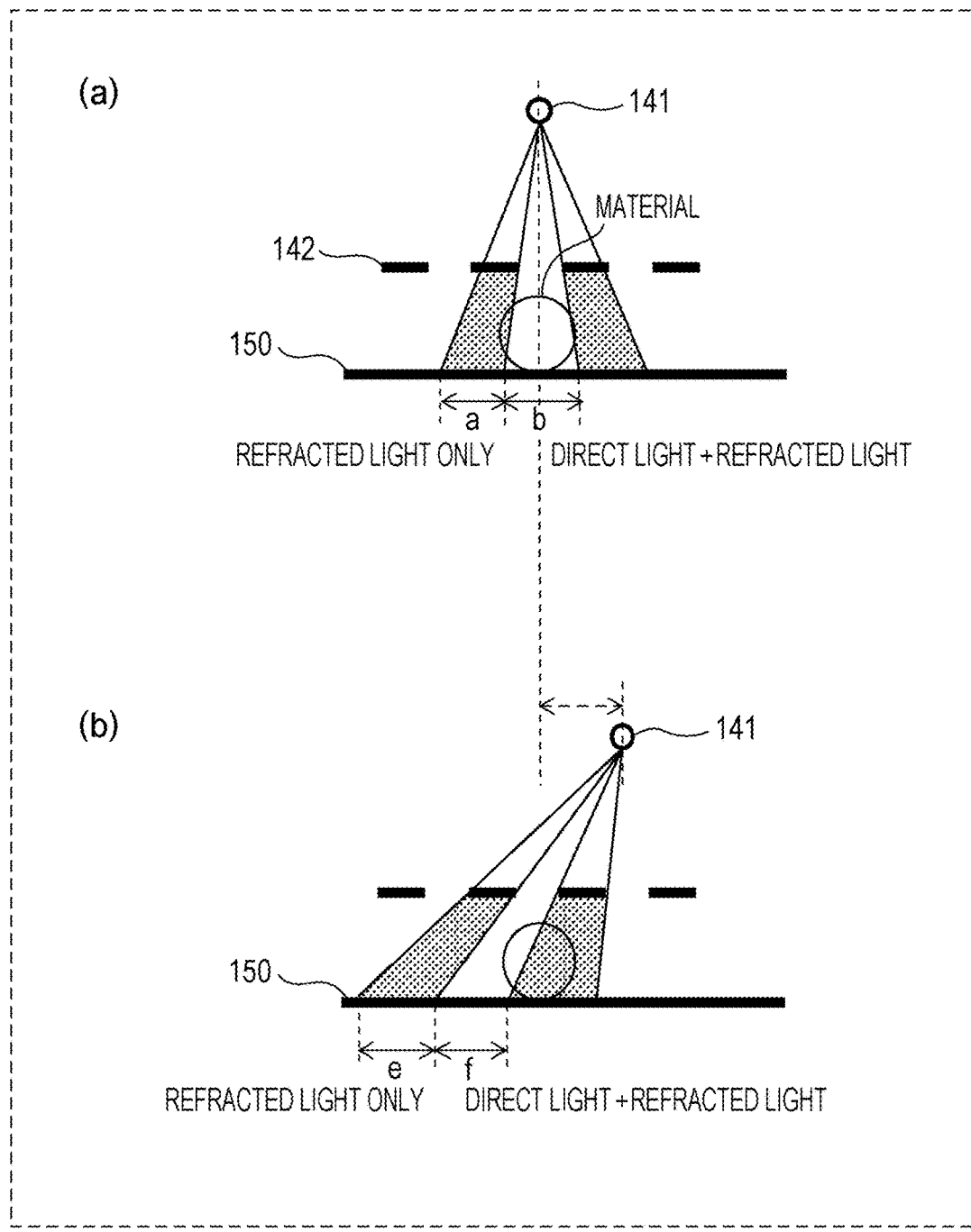
FIG. 7 is a diagram that illustrate examples of the relationship between the position of a point light source and the light received by an image sensor, according to Embodiment 1.

FIG. 7 illustrates an example of the relationship between the position of a point light source 141 and the light received by the image sensor 150. In the example of FIG. 7, the material is positioned inside a culture fluid. For example, as illustrated in the upper part of FIG. 7, when the light transmitted by the light-transmitting part of the mask 142 from the point light source 141 shines on a part of the material and a region b of part of the photosensitive surface of the image sensor 150, the light shining on the part of the material and the region b of the image sensor 150 includes not only direct light from the point light source 141, but also refracted light. The refracted light is light which has passed through the light-transmitting part of the mask 142 from the point light source 141, and which has been refracted, reflected, or scattered by the culture fluid or the translucent material. On the other hand, a portion of the direct light from the point light source 141 is blocked by the light-blocking part of the mask 142, and does not reach a region a of the photosensitive surface of the image sensor 150. However, the refracted light reaches the region a. Consequently, the region a of the photosensitive surface of the image sensor 150 senses only refracted light, and thus is dark, whereas the region b senses both direct light and refracted light, and thus is bright.

However, if the point light source 141 illustrated in the upper part of FIG. 7 is turned off and another point light source 141 illustrated in the lower part of FIG. 7 is turned on, a region e which is different from the region a on the photosensitive surface of the image sensor 150 becomes dark due to sensing only refracted light. Also, a region f which is different from the region b on the photosensitive surface of the image sensor 150 becomes bright due to sensing both refracted light and direct light.

In other words, if the positions of the point light sources 141 that illuminate the material are different, partial regions of the photosensitive surface of the image sensor 150 sometimes become brighter due to sensing both refracted light and direct light, and other times become darker due to sensing only refracted light. In Embodiment 1, the multiple point light sources 141 arranged as illustrated in FIG. 4, namely, the multiple point light sources 141 along the direction in which the light-transmitting part and the light-blocking part of the mask 142 are alternately and regularly arranged, provide illumination one after another. Consequently, partial regions (specifically, pixels) of the photosensitive surface of the image sensor 150 become brighter and darker periodically. Hereinafter, a segment that becomes brighter is designated a bright segment, while a segment that becomes darker is designated a dark segment. In Embodiment 1, the dark brightness of individual regions (for example, pixels) of the photosensitive surface of the image sensor 150 is utilized to generate a clear image of the material.

[2-2. Storage Unit]

The storage unit 110 stores an image acquired by the image sensor 150 in association with the illumination or the positions of the point light sources 141 which were turned on during imaging as set by the control unit 160 (hereinafter designated the illumination positions).

FIG. 8 is an example of information stored by the storage unit 110. The storage unit 110 stores an ID identifying an image acquired by the image sensor 150 in association with an illumination position of a point light source 141 which was turned on during imaging. An illumination position is indicated as a point on a coordinate system whose origin is taken to be the upper-left corner of a plane that includes the multiple active pixels of the image sensor 150, in which the horizontal direction of the image sensor 150 is treated as the x-axis, and the vertical direction is treated as the y-axis, for example. In the example of the illumination equipment 140 in Embodiment 1, the multiple point light sources 141 are arranged on a plane parallel to the surface of the image sensor 150 (namely, the photosensitive surface), so as to face the surface of the image sensor 150. In other words, the distance from the surface of the image sensor 150 to each and every point light source 141 is the same. For this reason, illumination positions are expressed in two dimensions. However, illumination positions may also be expressed in three dimensions. Also, if all of the point light sources 141 are arranged in a linear manner, illumination positions may be expressed in one dimension.

[2-3. Dark Image Processing Unit]

The dark image processing unit 120 is realized by at least one control circuit or processing circuit. In Embodiment 1, the dark image processing unit 120 uses first pixel information corresponding to a first pixel region in the first image and second pixel information corresponding to a second pixel region in the second image described above to generate a third image. Herein, the image sensor 150 includes the first pixel region and the second pixel region, whereby the light-blocking part of the mask 142 is positioned between the first pixel region and the first light source, and the light-blocking part of the mask 142 is positioned between the second pixel region and the second light source. Note that each pixel region may be a pixel, or a block made up of multiple pixels. Also, the pixel information if the brightness or a brightness value in the present embodiment, but may also be another value related to a pixel.

FIG. 9 is a function block diagram illustrating a detailed configuration of the dark image processing unit 120. As illustrated in FIG. 9, the dark image processing unit 120 is made up of a data acquisition unit 121, a minimum value decision unit 123, an image generation unit 125, a pixel selection unit 126, and a storage unit 127.

The data acquisition unit 121 acquires, from the storage unit 110, an image to use in image processing, or in other words the brightness values of the individual pixels included in the image, and the illumination position corresponding to the image.

The pixel selection unit 126 selects a pixel on which to perform a brightness calculation from among the multiple pixels of the image sensor 150, or in other words the multiple pixels in the image to be generated. Note that the pixel selected by the pixel selection unit 126 hereinafter is also designated the selected pixel.

The minimum value decision unit 123 compares the brightness value of the pixel selected by the pixel selection unit 126 to the brightness values of the pixels at the same position in each of multiple images stored in the storage unit 110, and from among these multiple images, specifies the image that includes the pixel having the minimum brightness value. The minimum value decision unit 123 decides the minimum brightness value as the minimum value of the brightness for the selected pixel.

Note that, as described above, the minimum value decision unit 123 decides the minimum value of the brightness for the selected pixel by comparing the respective brightness values of multiple images, but may also decide the minimum value of the brightness for the selected pixel by another method. Namely, the minimum value decision unit 123 specifies an image acquired by imaging when the selected pixel is illuminated by a point light source 141 at a predetermined illumination position, and in that image, decides the brightness value of the pixel at the same position as the selected pixel as the minimum value. The predetermined illumination position is decided by an image acquired by imaging in advance in a state in which there is no object, for example. Also, the predetermined illumination may be decided according to the geometric relationship between the point light sources, the mask 142, and the image sensor 150.

Figure 10:
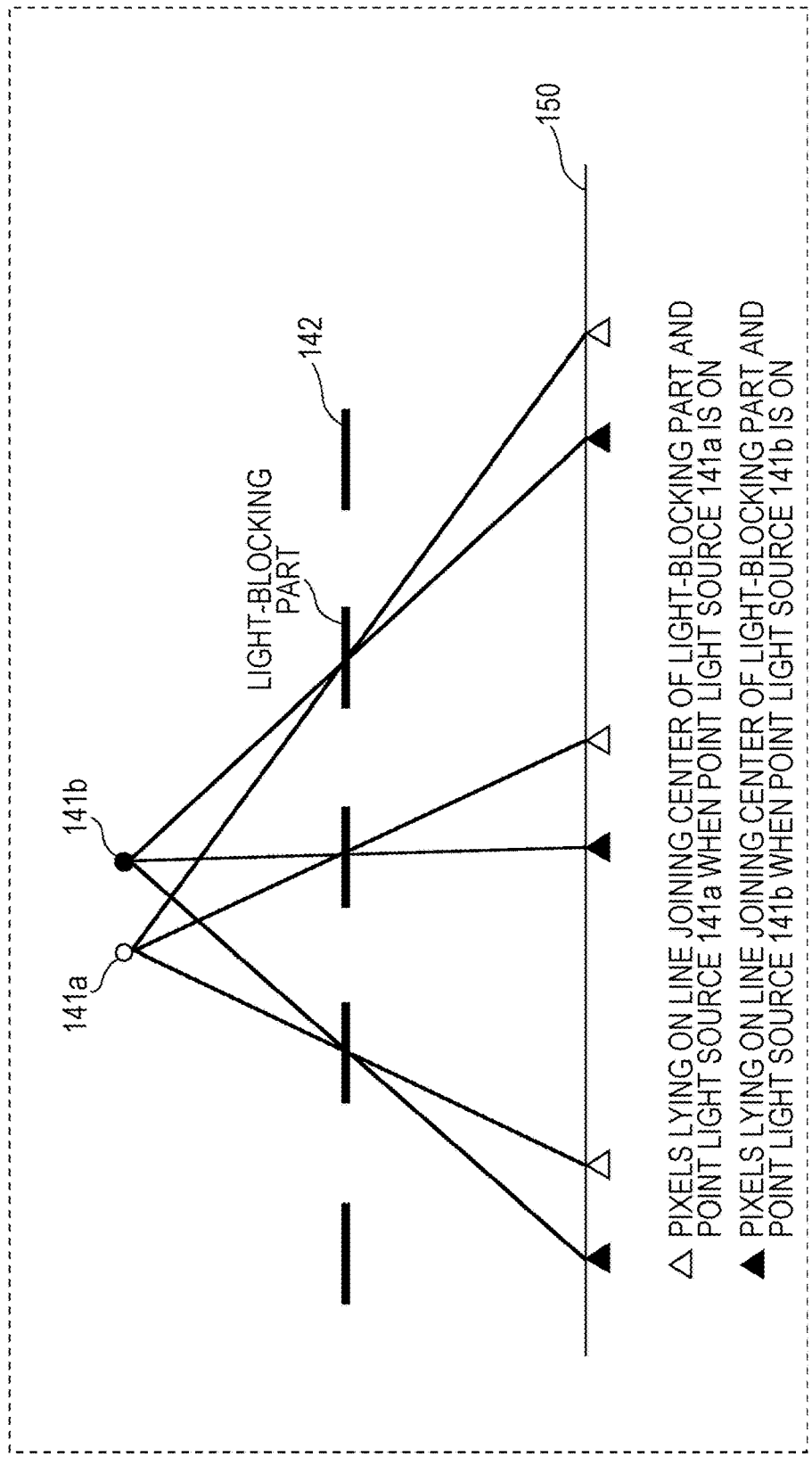
FIG. 10 is a schematic diagram illustrating the positional relationship between point light sources, the center of a light-blocking part of a mask, and pixels according to Embodiment 1.

FIG. 10 illustrates the positional relationship between the point light sources, the center of the light-blocking part of the mask 142, and the pixels.

As illustrated in FIG. 10, the point light source 141*a* or 141*b*, the center of the light-blocking part of the mask 142, and the pixels of the image sensor 150 exist in a geometric positional relationship. From such a positional relationship, an illumination position positioned in the center of the light-blocking part, or an illumination position positioned on a line joining a pixel and the center of the light-blocking part, is decided for each pixel.

Figures 11, 12:
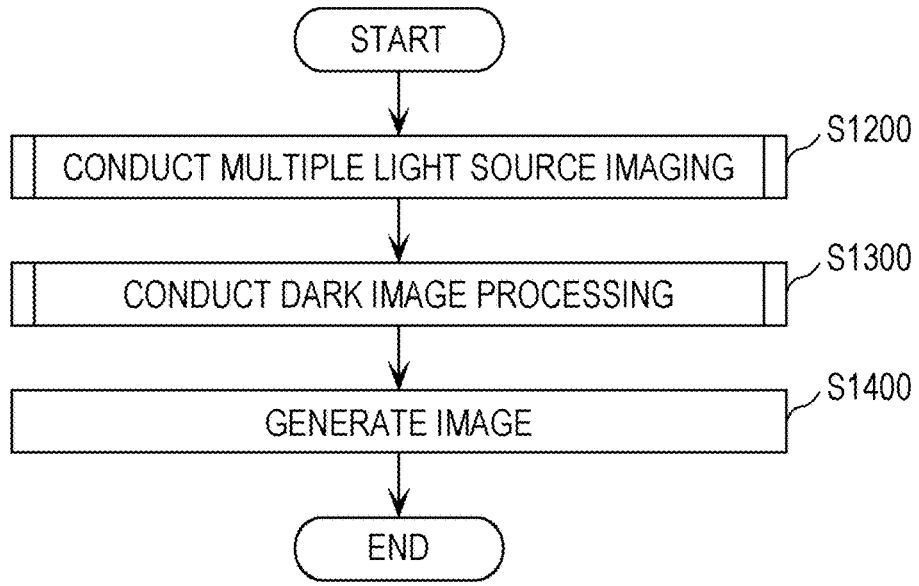
FIG. 11 illustrates a table in which predetermined illumination positions are recorded for each pixel.
FIG. 12 is a flowchart illustrating an example of the operation of an image generating apparatus according to Embodiment 1.

FIG. 11 illustrates a table in which predetermined illumination positions are recorded for each pixel. In this table, for each of all pixel positions expressed by xy coordinates on the image sensor 150, illumination positions of point light sources 141 positioned on a line joining the relevant pixel position and the center of the light-blocking part are recorded, for example. Illumination positions are expressed by xy coordinates on the image sensor. In other words, from among images obtained by imaging when the point light source 141 at one of the illumination positions is turned on, the minimum value decision unit 123 decides the brightness value of the pixel at the pixel position associated with the illumination position in the table as the minimum value of the brightness for the selected pixel.

The storage unit 127 stores the image and the illumination position acquired by the data acquisition unit 121 from the storage unit 110, and the minimum value decided by the minimum value decision unit 123.

The image generation unit 125 generates an image. Pixels included in the generated image have the brightness of the minimum value decided by the minimum value decision unit 123. In other words, the image generated by the image generation unit 125 is the third image described above, and is also called a dark image.

Note that the data acquisition unit 121, the minimum value decision unit 123, and the image generation unit 125 included in the dark image processing unit 120 are realized by a computer system (not illustrated) made up of components such as a central processing unit (CPU), random access memory (RAM), and read-only memory (ROM). Some or all of the functions of the structural elements of the dark image processing unit 120 may also be achieved by having the CPU execute a program recorded in the ROM, using the RAM as a working memory. Additionally, some or all of the functions of the structural elements of the dark image processing unit 120 may also be achieved by a specialized hardware circuit.

[2-4. Output Unit]

The output unit 130 is an output apparatus that presents an image generated by the dark image processing unit 120, or a means of outputting an image as electronic data. The output apparatus that presents an image may be a display, for example. The means of outputting an image as electronic data may be a USB connector, for example.

[3. Operation of Image Generating Apparatus]

Next, the operation of the image generating apparatus 10 configured as above will be described.

FIG. 12 is a flowchart illustrating an example of the operation of the image generating apparatus 10 according to Embodiment 1.

The image generating apparatus 10 starts operation in response to the input of an operation start command which is not illustrated.

(Step S1200)

The imaging unit 100 uses the multiple point light sources 141 of the illumination equipment 140 to take multiple images of the object. This imaging is also referred to as multiple light source imaging. Multiple images of the object are taken while the object is illuminated by light transmitted through the mask 142. Specifically, every time each of the multiple point light sources 141 of the illumination equipment 140 illuminates the object, the imaging unit 100 acquires multiple images of the object by recording the intensity of the light that reaches the photosensitive surface of the image sensor 150. The acquired images are stored in the storage unit 110 together with position information about the point light sources 141 which were illuminating the object during imaging (in other words, the illumination positions). Herein, the positions of the multiple point light sources 141 are fixed with respect to the image sensor 150, and thus the position information about each of the multiple point light sources 141 is predetermined. Multiple light source imaging will be discussed in detail later.

(Step S1300)

The dark image processing unit 120 conducts a dark image process on the dark parts of the image taken in step S1200 by the mask 142 of the illumination equipment 140. In step S1200, by conducting imaging with illumination provided by each of the point light sources 141 at mutually different positions, the positions of the dark parts are different for each image. The dark image processing unit 120 compares the brightness of the same pixel position among the multiple images taken in step S1200. The dark image processing unit 120 decides the minimum value of the brightness for each pixel position (or selected pixel). The dark image process will be described in detail later.

(Step S1400)

The image generation unit 125 of the dark image processing unit 120 generates and outputs an image on the basis of the minimum values of the brightness decided for each pixel position in step S1300. After that, the image generating apparatus 10 ends operation.

In this way, an image generating method according to Embodiment 1 is an image generating method that generates an image of a translucent material, and uses the first light source 141A, the second light source 141B, the image sensor 150, and the mask 142. Additionally, with this image generating method, in step S1200, (a) the image sensor 150 acquires a first image of the material when illumination is provided by the first light source 141A, and (b) the image sensor 150 acquires a second image of the material when illumination is provided by the second light source 141B. Herein, the image sensor 150 includes the first pixel region and the second pixel region, whereby the light-blocking part is positioned between the first pixel region and the first light source 141A, and the light-blocking part is positioned between the second pixel region and the second light source 141B. In such a case, additionally, with this image generating method, in step S1300 and step S1400, the first pixel information corresponding to the first pixel region in the first image and the second pixel information corresponding to the second pixel region in the second image are used to generate the third image.

[3-1. Multiple Light Source Imaging]

At this point, the operation of the imaging unit 100 in step S1200 illustrated in FIG. 12 will be described in detail.

Figure 13:
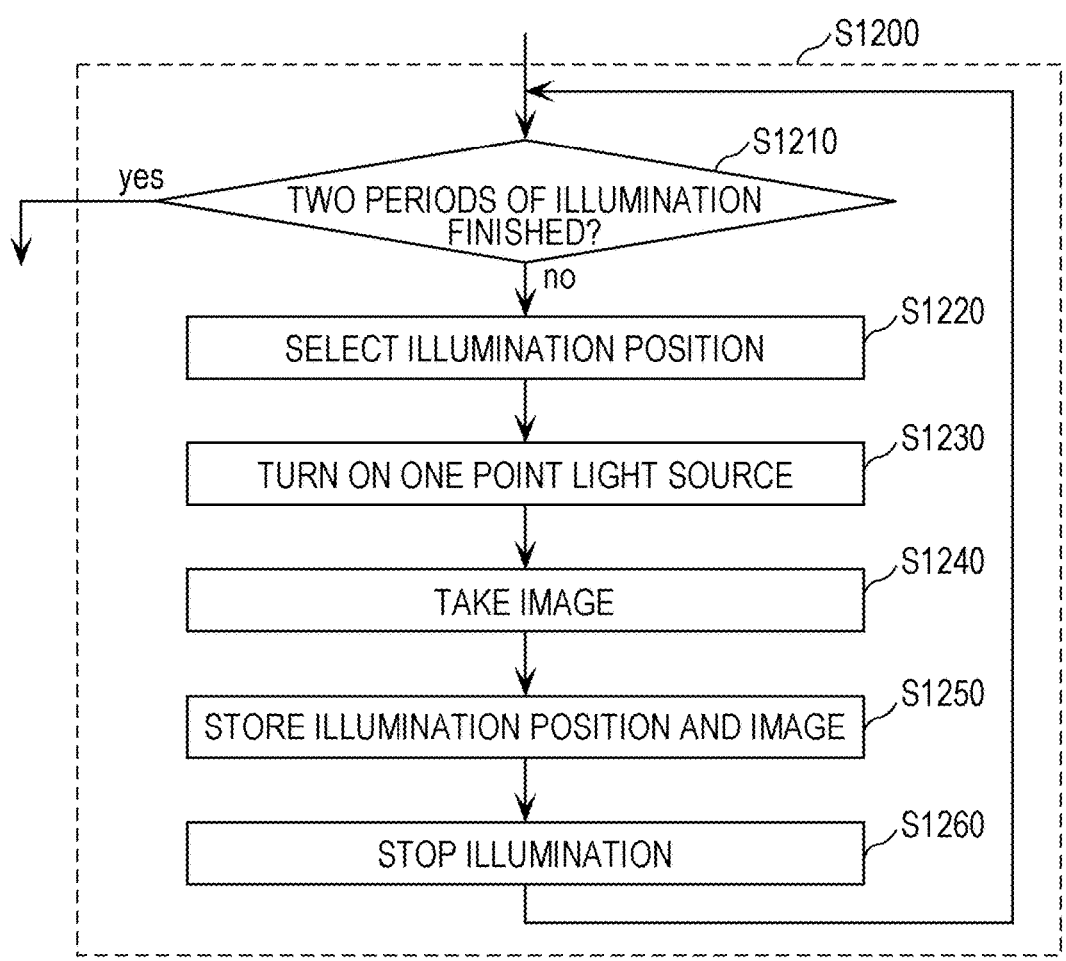
FIG. 13 is a flowchart illustrating an example of the operation of an imaging unit according to Embodiment 1.

FIG. 13 is a flowchart illustrating an example of the operation of the imaging unit 100.

(Step S1210)

The control unit 160 references a list indicating multiple predetermined illumination positions, or in other words a list indicating the positions of the multiple point light sources 141 of the illumination equipment 140 (hereinafter designated the illumination position list), and determines whether or not imaging of the object illuminated from each illumination position has finished.

At this point, if imaging with illumination from all illumination positions included in the illumination position list has finished (step S1210, yes), the flow proceeds to step S1300. On the other hand, if imaging with illumination from any of the illumination positions included in the illumination position list has not finished (step S1210, no), the flow proceeds to step S1120. Note that imaging with illumination from all illumination positions included in the illumination position list being finished means that the imaging by illumination from two periods' worth of multiple illumination positions has finished. Details about the periodicity of these two periods will be described later using FIG. 14.

(Step S1220)

The control unit 160 selects an illumination position from which illumination has not been provided from among the multiple illumination positions included in the illumination position list, and outputs a control signal to the illumination equipment 140. The control signal includes the selected illumination position. Each illumination position in the illumination position list, or in other words, the position of each point light source 141, is indicated by a number assigned to each point light source 141, for example. Alternatively, each illumination position is indicated by coordinate values in an xyz space in which the xy plane is taken to be the surface of the image sensor 150, or by coordinate values on an xy plane set parallel to the surface of the image sensor 150, for example. The selection of an illumination position is conducted in ascending order of the illumination position list, for example.

(Step S1230)

The illumination equipment 140 starts illuminating the object, in accordance with the control signal output from the control unit 160 in step S1220. In other words, from among the multiple point light sources 141 included in the illumination equipment 140, the point light source 141 at the illumination position selected in step S1220 starts radiating light.

(Step S1240)

While the object is being illuminated by the point light source 141, the image sensor 150 acquires an image formed by the light that travels from the point light source 141 through the mask 142, and is additionally transmitted through the object.

(Step S1250)

The control unit 160 associates the image acquired in step S1240 with the illumination position of the point light source 141 that provided illumination during the acquisition of that image, and outputs to the storage unit 110. The storage unit 110 stores the image and the illumination position in association with each other.

(Step S1260)

After that, the control unit 160 outputs a control signal to the illumination equipment 140, and stops the illumination of the object. Note that the stopping of illumination may also not be conducted in accordance with a control signal from the control unit 160. For example, the illumination equipment 140 may measure the length of time since illumination by one of the point light sources 141 started, and actively stop illumination after the measured length of time exceeds a predetermined length of time. Alternatively, after the image sensor 150 finishes acquiring the image in step S1240, the image sensor 150 may output a control signal for stopping the illumination to the illumination equipment 140. After step S1260, the flow returns to step S1210.

By repeating the processes from step S1210 to step S1260, the object is successively irradiated with light from the point light sources 141 at all of the illumination positions included in the illumination position list. In addition, every time the object is irradiated with light through the mask 142, the image sensor 150 acquires an image.

[3-2. Point Light Source Arrangement]

Hereinafter, illumination positions, in other words the positions of the multiple point light sources 141, will be described in detail.

Figure 14:
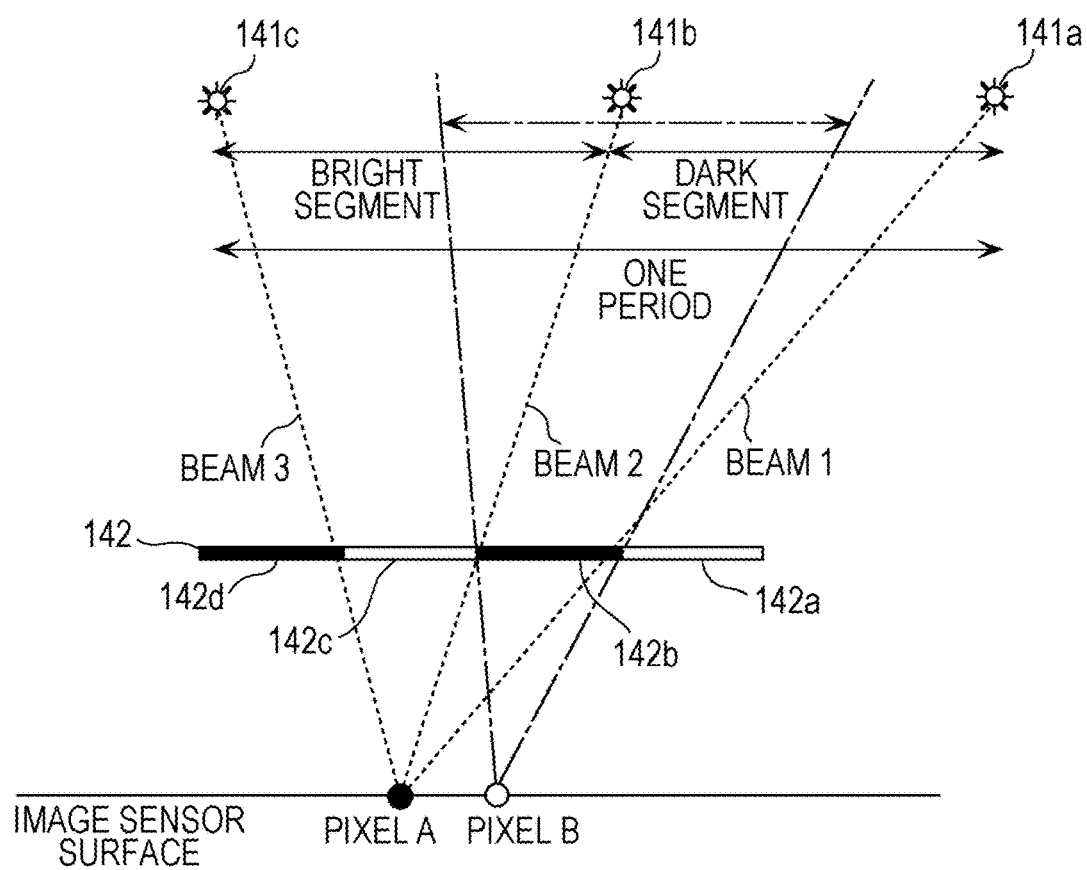
FIG. 14 is a schematic diagram explaining a specific example of a period of bright segments and dark segments according to Embodiment 1.

FIG. 14 is a schematic diagram explaining a light and dark pattern created by the positions of the point light sources 141 and the position of the mask 142 for one arbitrary pixel on the image sensor 150. The black rectangles in the mask 142 represent the light-blocking part, while the white rectangles represent the light-transmitting part that transmits light. Note that in FIG. 14, each of the point light source 141a, the point light source 141b, and the point light source 141c is one of the multiple point light sources 141 included in the illumination equipment 140.

The light from the point light source 141a that reaches an arbitrary pixel A on the image sensor 150 is a beam 1, which travels over the boundary between the light-blocking part 142b and the light-transmitting part 142a of the mask 142. The light from the point light source 141b that reaches the pixel A is a beam 2, which travels over the boundary between the light-blocking part 142b and the light-transmitting part 142c of the mask 142. In the case in which a point light source 141 is positioned to the left of the point light source 141a and also to the right of the point light source 141b in FIG. 14, the light beam radiating from that point light source 141 to the pixel A will be blocked by the light-blocking part 142b of the mask 142. In other words, with respect to the pixel A, the segment from the position of the point light source 141a to the position of the point light source 141b becomes a segment that is dark because direct light from a light source is blocked by the light-blocking part 142b of the mask 142, and the light beam does not reach the pixel A (hereinafter, such a segment is designated a dark segment). Note that the dark segment can also be considered to be the segment during which respective point light sources from the point light source 141a to the point light source 141b provide illumination one after another.

Meanwhile, the light beam from the point light source 141c that reaches the pixel A is a beam 3, which travels over the boundary between the light-transmitting part 142c and the light-blocking part 142d of the mask 142. In the case in which a point light source 141 is positioned to the left of the point light source 141b and also to the right of the point light source 141c in FIG. 14, the light beam radiating from that point light source 141 to the pixel A will be transmitted by the light-transmitting part 142c of the mask 142, and reach the pixel A on the surface of the image sensor 150. In other words, with respect to the pixel A, the segment from the position of the point light source 141b to the position of the point light source 141c becomes a segment that is bright because direct light from a light source reaches the pixel A (hereinafter, such a segment is designated a bright segment). Note that the bright segment can also be considered to be the segment during which respective point light sources from the point light source 141b to the point light source 141c provide illumination one after another. The period described above is made up of a bright segment and a dark segment. That is, one bright segment and one dark segment join to form one period of illumination. In other words, when the multiple point light sources 141 in the illumination equipment 140 are arranged at equal intervals, and provide illumination one after another for a predetermined time each, the sequence over which each of the multiple point light sources 141 arranged in one bright segment and one dark segment provides illumination one after another becomes one period.

For the pixel B at a different position from the pixel A, the boundary positions between the bright segments and the dark segments are different from the boundary positions with respect to the pixel A. However, the sizes of the bright segments and the dark segments with respect to the pixel A are the same as the sizes of the bright segments and the dark segments with respect to the pixel B. This is because, with respect to the pixel A and the pixel B, the sizes of the light-blocking part and the light-transmitting part of the mask 142, the distance between the mask 142 and the surface of the image sensor 150, and the distance between the point light sources 141 and the surface of the image sensor 150 are the same. In other words, for an arbitrary pixel on the image sensor 150, the periods of light and dark are the same, but the phase of the light and dark pattern is different depending on the position of the pixel.

In step S1300 illustrated in FIG. 12, for each pixel of the image sensor 150, the dark image processing unit 120 decides the minimum value of the brightness for the pixels at the same position in each of the multiple images acquired by imaging. The minimum value of the brightness corresponds to the dark segment of each pixel on the image sensor 150.

In other words, in Embodiment 1, a partial region of the photosensitive surface of the image sensor 150 acquires a first image while in a state in which the light-blocking part of the mask 142 is arranged between a first light source illuminating the material and the partial region. As a result, a first image in the dark segment is acquired. Also, another partial region of the photosensitive surface of the image sensor 150 acquires a second image while in a state in which the light-blocking part of the mask 142 is arranged between a second light source illuminating the material and the partial region. As a result, a second image in the dark segment is acquired.

At this point, a required imaging condition for specifying the minimum value of the brightness for all pixels in the taken images is that imaging in the illumination state of a dark segment is conducted for all pixels on the image sensor 150. For each of all pixels on the image sensor 150, the phase is different, but the period is the same. Consequently, it is at least necessary to conduct imaging when illumination is provided by one point light source 141 arranged in the dark segment illustrated in FIG. 14. That is, it is necessary for the position of the point light source 141 providing illumination to move by a distance corresponding to at least a half-period. In actuality, when light from multiple point light sources 141 is transmitted through the mask 142 one after another, the boundary between a bright segment and a dark segment is indistinct.

Figure 15:
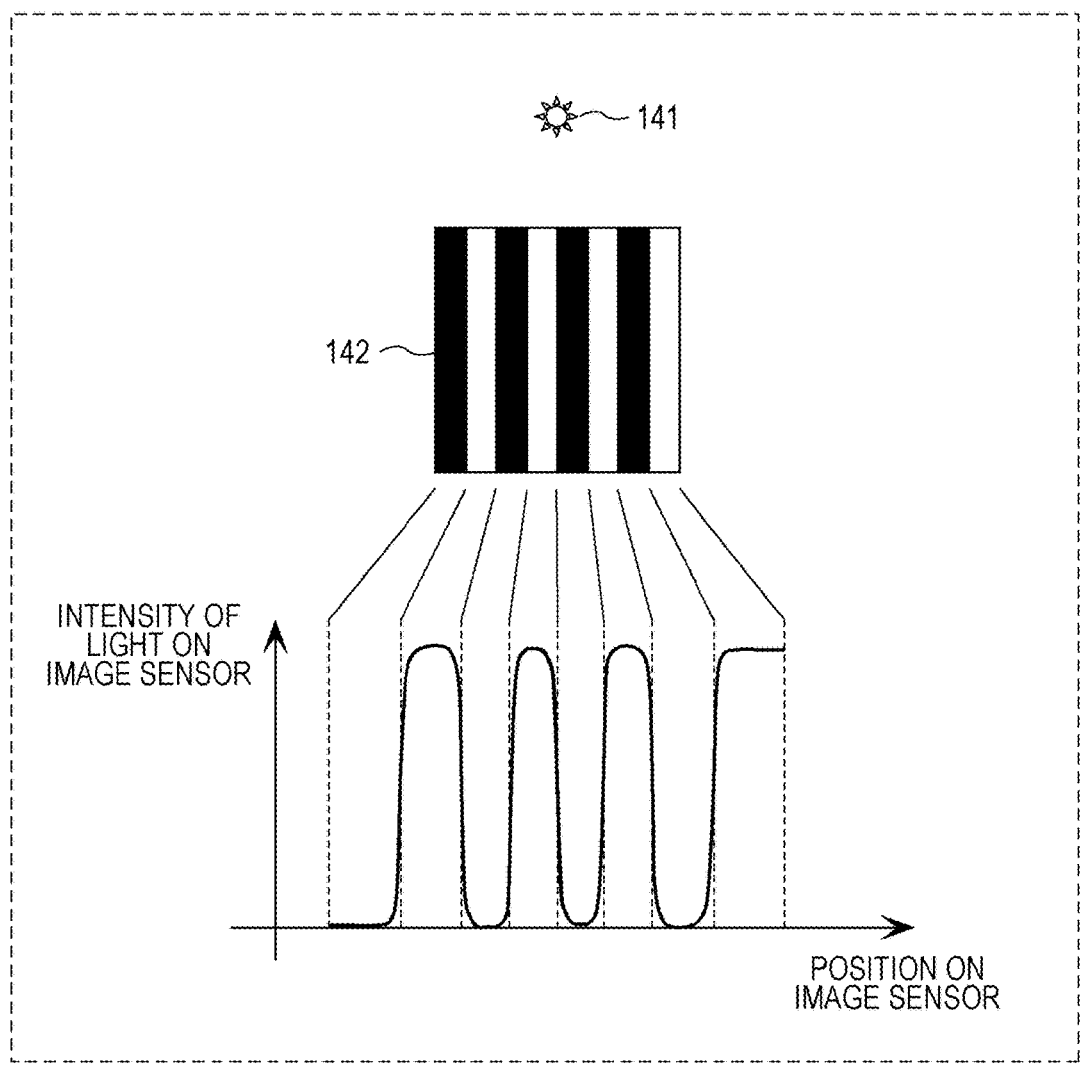
FIG. 15 is a diagram illustrating the intensity of light at respective positions on an image sensor according to Embodiment 1.

FIG. 15 illustrates the intensity of light at respective positions on the image sensor 150. For example, as in FIG. 15, the brightness at the boundaries changes gradually. For this reason, even if the point light source 141 providing illumination moves by a distance corresponding to a half-period, an imaging result in a bright segment and a dark segment may not be obtained for all pixels on the image sensor 150 in some cases. The inventors empirically confirmed that if the point light sources 141 are arranged at intervals corresponding to ⅓ period and imaging is conducted by turning on the point light sources 141 one after another over a range of movement corresponding to two periods, an imaging result in a bright segment and a dark segment is obtained for all pixels on the image sensor 150. In other words, the interval of the multiple point light sources 141 in the illumination equipment 140 is less than or equal to a distance corresponding to ½ period, and preferably less than or equal to a distance corresponding to ⅓ period. In addition, the certain distance between the first light source 141A and the second light source 141B discussed earlier is the distance between the illumination position of a bright segment for an arbitrary pixel on the image sensor 150, and the illumination position of a dark segment for that pixel. Specifically, when the interval of the multiple point light sources 141 is a distance corresponding to ⅓ period, the certain distance between the first light source 141A and the second light source 141B discussed earlier is a distance equivalent to ⅓ or ⅔ of the period.

For example, when the point light sources 141 are arranged at intervals corresponding to ⅓ period over the range of two periods, and the point light sources 141 are arranged in the direction cutting across the stripes, the illumination position list referenced in step S1210 is a list indicating seven illumination positions. Note that the direction cutting across the stripes is the direction in which the light-blocking part and the light-transmitting part of the mask 142 are alternately arranged.

[3-3. Dark Image Processing Unit]

The operation of the dark image processing unit 120 in step S1300 illustrated in FIG. 12 will be described in detail.

Figure 16:
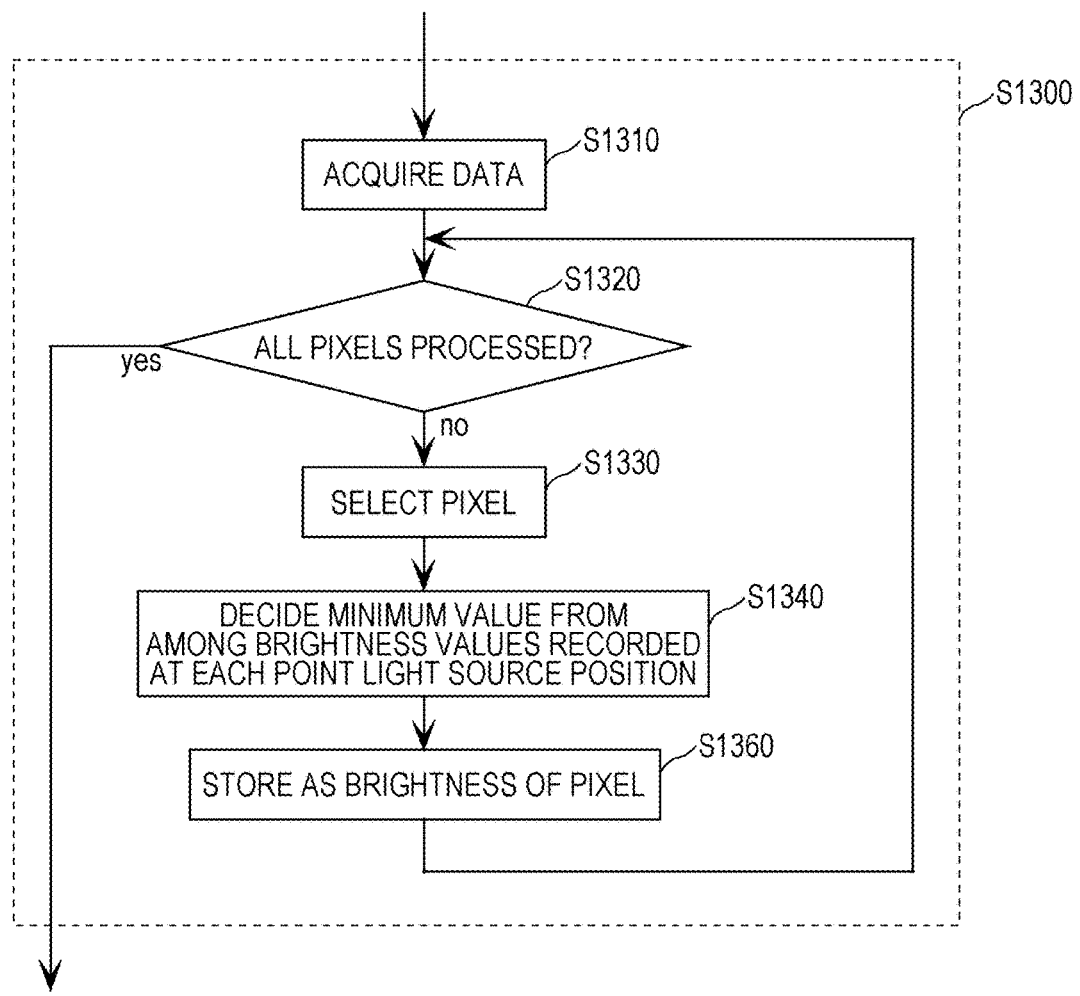
FIG. 16 is a flowchart illustrating an example of the operation of a dark image processing unit according to Embodiment 1.

FIG. 16 is a flowchart illustrating an example of the operation of the dark image processing unit 120 according to Embodiment 1.

(Step S1310)

The data acquisition unit 121 of the dark image processing unit 120 acquires, from the storage unit 110, the image acquired in step S1200 and the illumination position corresponding to the image.

(Step S1320)

The pixel selection unit 126 determines whether or not the dark image process has finished for all pixels included in the image to generate. The dark image process refers to the processes from step S1320 to step S1360.

If the dark image process has finished for all pixels included in the image to be generated (step S1320, yes), the dark image processing unit 120 ends the dark image process (that is, the flow proceeds to step S1400).

If the dark image process has not finished for any of the pixels included in the image to be generated (step S1320, no), the dark image processing unit 120 continues the dark image process (that is, the flow proceeds to step S1330). Note that the image to be generated includes fewer pixels than the image with the fewest pixels from among the multiple images acquired in step S1200.

(Step S1330)

The pixel selection unit 126 selects one pixel from among the multiple pixels included in the image to be generated. The one pixel selected at this point is a pixel on which the dark image process has not been executed yet from among the multiple pixels included in the image to be generated. Note that the pixel values in the image to be generated have a default value of 0.

(Step S1340)

For the pixel position of the pixel selected in step S1330, the minimum value decision unit 123 compares the brightness values of the pixels at the pixel position in each of the multiple images taken in step S1200, and decides the minimum brightness value.

(Step S1360)

The image generation unit 125 stores the minimum brightness value decided in step S1340 as the brightness value of the pixel selected in step S1330.

By repeating each of the processes from step S1320 to step S1360, brightness values can be generated for all pixels in the image to be generated. With this arrangement, the third image, that is, a dark image is generated.

[4. Advantageous Effects]

According to the image generating apparatus 10 according to Embodiment 1 as above, light from multiple point light sources 141 at different positions is projected through the mask 142 onto an object and the image sensor 150, to thereby conduct imaging with transmitted light. The mask 142 has a repeating pattern of a light-blocking part and a light-transmitting part, such as stripes or a checker pattern. From among the acquired multiple images, for each pixel position, the minimum brightness value when imaging is conducted in a state in which direct light from a point light source 141 is blocked by the light-blocking part of the mask 142 is decided. The minimum brightness value indicates a brightness that does not include direct light, but only scattered light or refracted light from the object. By generating an image with minimum brightness values, a clear image containing much information about the intermediate brightness due to scattered light or refracted light, excluding direct light, can be generated as the dark image.

FIGS. 17A and 17C are diagrams illustrating a comparison between a dark image according to the present embodiment, and an image of the related art.

The image illustrated in FIG. 17A is a photographic image photographing an embryo placed on an image sensor with transmitted light from a single point light source. The graph illustrated in FIG. 17B is a histogram of pixels included in the photographic image of FIG. 17A with respect to brightness (pixel value). The image illustrated in FIG. 17C is an image of an embryo obtained by the present embodiment (that is, a dark image). The graph illustrated in FIG. 17D is a histogram of pixels included in the dark image of FIG. 17C with respect to brightness (pixel value). As illustrated in FIG. 17B, the histogram of the photographic image illustrated in FIG. 17A taken with transmitted light from a point light source has many extremely bright pixels and many extremely dark pixels, and although the contrast is high, there is a large amount of flicker or glare. Consequently, the histogram indicates that the photographic image in FIG. 17A is an image in which the shape of the object is difficult to discern. In contrast, as illustrated in the histogram in FIG. 17D, in the dark image illustrated in FIG. 17C generated by the present embodiment, there are not many extremely dark pixels or extremely bright pixels, many pixels are distributed in the intermediate brightness, and there is much shading information. Consequently, the dark image illustrated in FIG. 17C is an image in which shapes are easy to discern from lines and surfaces. In this way, in the present embodiment, clear images containing much shading information can be obtained.

Note that in Embodiment 1, the dark image processing unit 120 selects the minimum value of the brightness for a pixel at a target pixel position from among multiple images taken while illumination is provided by each of multiple point light sources 141 at different illumination positions one after another. Subsequently, the dark image processing unit 120 decides the selected minimum value as the brightness of the pixel at that pixel position in the dark image. However, as illustrated in FIG. 11, the brightness of a pixel at the target pixel position may also be selected in accordance with information indicating an illumination position at which a predetermined pixel becomes a pixel having a minimum brightness value (dark pixel). In other words, in accordance with such information, a pixel at a predetermined pixel position is selected with respect to the illumination position of the point light source 141 that provided illumination during the imaging of that pixel. Subsequently, the brightness value of the selected pixel at the pixel position is decided as the brightness value of the pixel at that pixel position in the dark image. Also, geometric relationships as illustrated in FIG. 10 may be stored, and the illumination position corresponding to a pixel at the target pixel position may be found by calculation every time. In this case, the brightness value of the pixel at the target pixel position is selected from the image taken when illumination is provided at the calculated illumination position, and the selected brightness value is decided as the brightness value of the pixel at that pixel position in the dark image.

Embodiment 2

In Embodiment 1, each pixel is imaged over a sequence of images that includes one or more periods of a bright segment and a dark segment, and for each pixel position, the minimum brightness value is decided from among the multiple images, and the brightness value of the pixel at that pixel position in the dark image is decided. In Embodiment 2, the arrangement of objects (for example, cells included in an embryo) is specified by analyzing the brightness distribution of the dark image generated by the dark image process of Embodiment 1. Hereinafter, Embodiment 2 will be described in detail.

Figure 18:
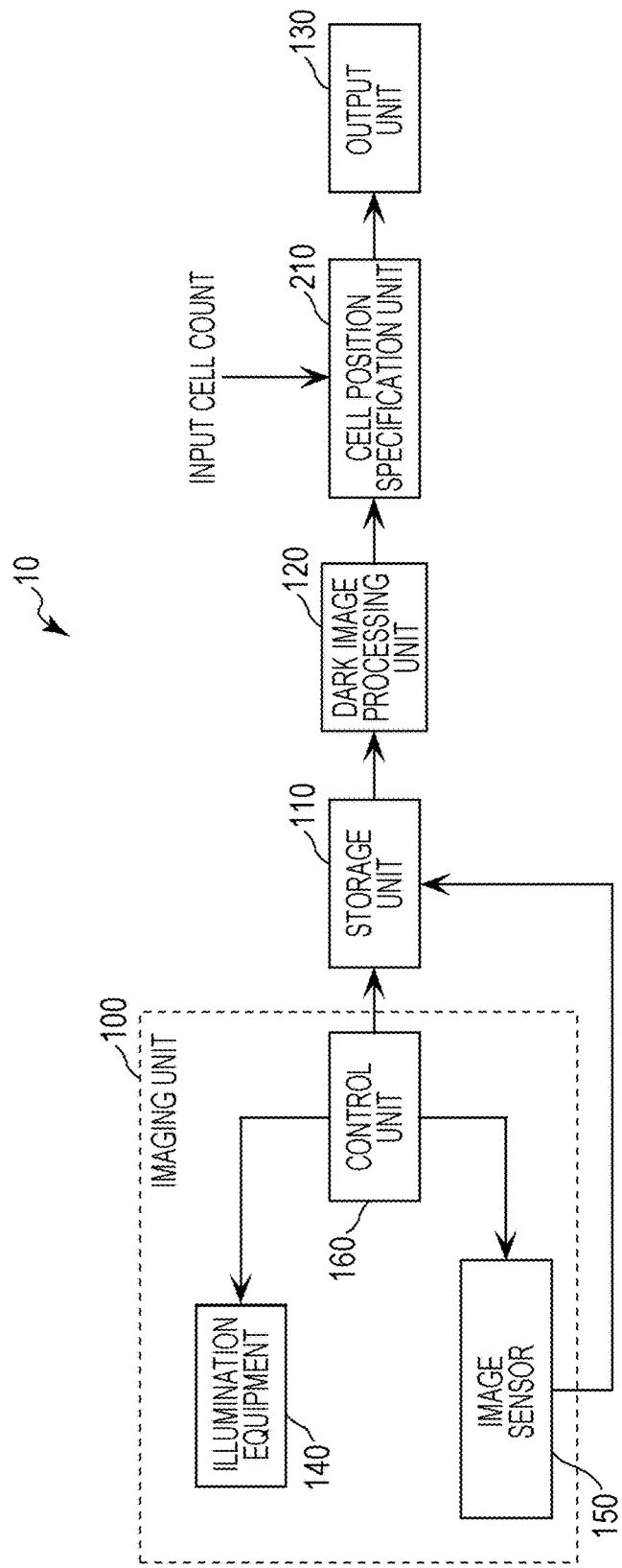
FIG. 18 is a function block diagram of an image generating apparatus according to Embodiment 2.

FIG. 18 is a function block diagram of the image generating apparatus 10 according to Embodiment 2.

The image generating apparatus 10 according to Embodiment 2 is provided with all of the structural elements of the image generating apparatus 10 of Embodiment 1, and additionally is provided with a cell position specification unit 210. Note that the cell position specification unit 210 is realized by a processing circuit, similarly to the dark image processing unit 120.

[Cell Position Specification Unit]

The cell position specification unit 210 acquires a cell count in accordance with an operation performed by a user, for example, and specifies the positions of a number of cells equal to the cell count from the dark image. In other words, in the present embodiment, the material which treated as the object is an embryo that includes cells. Additionally, the cell position specification unit 210 specifies a region having a brightness equal to or greater than a first threshold value in the dark image, that is, the third image, as the region where a cell is positioned. Note that this region where a cell is positioned will also be called a cell region.

Figure 19:
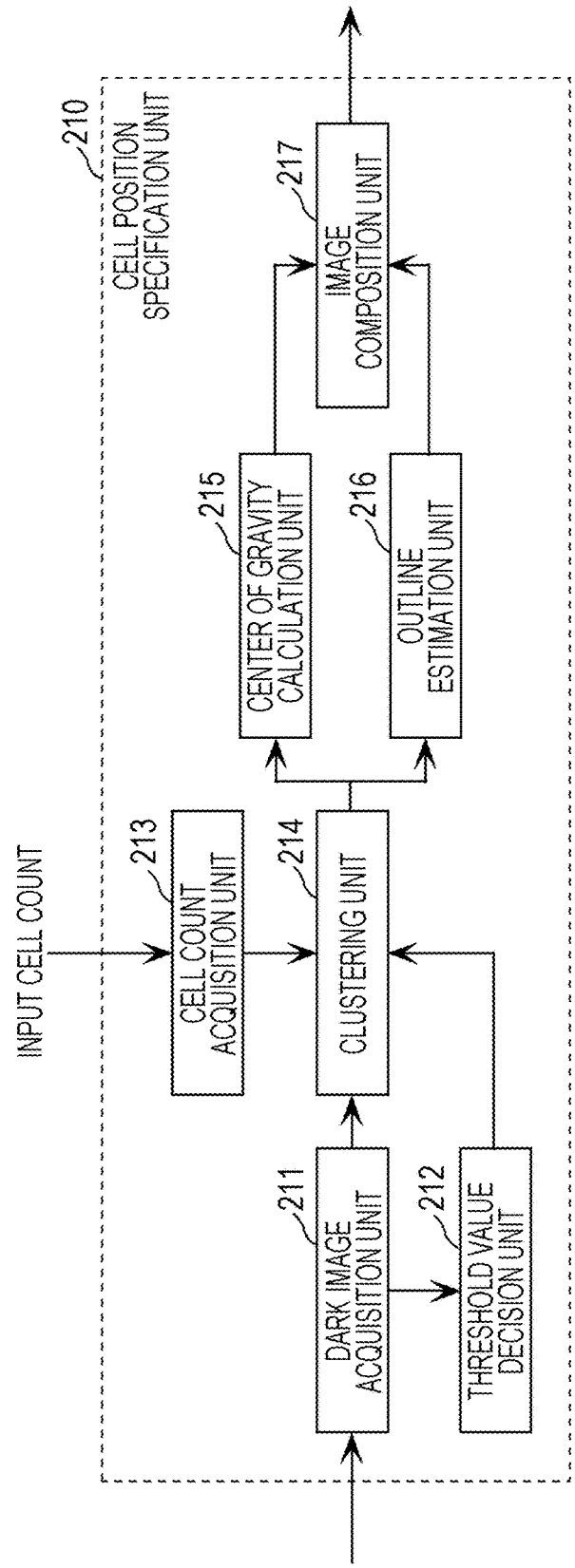
FIG. 19 is a function block diagram illustrating a detailed configuration of a cell position specification unit according to Embodiment 2.

FIG. 19 is a function block diagram illustrating a detailed configuration of the cell position specification unit 210. As illustrated in FIG. 19, the cell position specification unit 210 is provided with a dark image acquisition unit 211, a threshold value decision unit 212, a cell count acquisition unit 213, a clustering unit 214, a center of gravity calculation unit 215, an outline estimation unit 216, and an image composition unit 217.

The dark image acquisition unit 211 acquires a dark image generated by the dark image processing unit 120.

The threshold value decision unit 212 decides a threshold value of the brightness for selecting pixels to cluster, on the basis of a range of brightness in the dark image acquired by the dark image acquisition unit 211. The threshold value is the brightness that satisfies a condition whereby, in the brightness distribution of all pixels in the dark image, the number of pixels having a brightness less than or equal to the threshold value is 50% of the total number of pixels, for example. In other words, the threshold value is the median of the brightness distribution of all pixels in the dark image.

The cell count acquisition unit 213 acquires the designated cell count. For example, the cell count acquisition unit 213 receives a cell count input by the user through input means (not illustrated). Alternatively, for example, the cell count acquisition unit 213 references correspondence information between incubation time and cell count stored as a table in a storage unit (not illustrated), and acquires a cell count from the table on the basis of the incubation time measured by a timing means (not illustrated).

The clustering unit 214 divides a set made up of multiple pixels in the dark image acquired by the dark image acquisition unit 211, the multiple pixels having a brightness equal to or greater than the threshold decided by the threshold value decision unit 212, into a number of clusters equal to the cell count acquired by the cell count acquisition unit 213. The clustering unit 214 uses the brightness and the coordinates of the pixels for clustering. The clustering method is k-means clustering, for example.

For each of the clusters obtained by the clustering unit 214 and equal in number to the cell count, the center of gravity calculation unit 215 computes a center of gravity position of the multiple pixels included in that cluster.

The outline estimation unit 216 estimates the circumference of a circle centered on the center of gravity position calculated for each cluster by the center of gravity calculation unit 215 as the outline of each cell. The circle is a circle centered on the center of gravity position of the cluster, and is the circle of minimum radius that includes 80% or more of all elements (all pixels) in the cluster.

The image composition unit 217 generates a composite image by compositing a mark (for example, x) indicating each center of gravity position computed by the center of gravity calculation unit 215 and each outline estimated by the outline estimation unit 216 onto the dark image. In other words, the image composition unit 217 uses the dark image (that is, the third image) and the region where each cell is positioned to generate, as a composite image, a fourth image emphasizing the region where each cell is positioned.

FIG. 20 is a flowchart illustrating an example of the operation of the image generating apparatus 10 according to Embodiment 2.

(S1500)

The image generating apparatus 10 conducts the processes from steps S1200 to S1400 similarly to Embodiment 1, and additionally determines the positions of the cells.

At this point, the operation of the cell position specification unit 210 in step S1500 illustrated in FIG. 20 will be described in detail.

FIG. 21 is a flowchart illustrating an example of the operation of the cell position specification unit 210.

(S1510)

First, the threshold value decision unit 212 decides the threshold value of the brightness for selecting the pixels to cluster.

(S1520)

Next, the clustering unit 214 uses the threshold value to select multiple pixels to cluster from the dark image, and divides the set made up of the selected multiple pixels into a number of clusters equal to the cell count.

(S1530)

Next, the cell position specification unit 210 estimates an outline of a cell for each of the clusters equal in number to the cell count. In other words, the center of gravity calculation unit 215 computes the center of gravity position of each cluster. Subsequently, the outline estimation unit 216 derives, as the outline of the cell, the circumference of a circle centered on the center of gravity position and including 80% of all pixels in the cluster.

Figure 22:
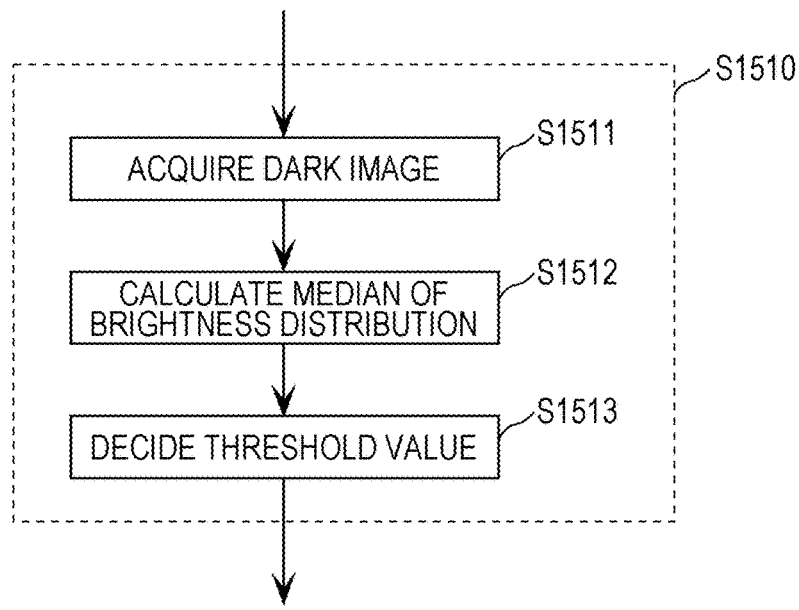
FIG. 22 is a flowchart illustrating an example of the operation of a threshold value decision unit according to Embodiment 2.

FIG. 22 is a flowchart illustrating an example of the operation of the threshold value decision unit 212. In other words, FIG. 22 illustrates details regarding the process of step S1510 in the flowchart of FIG. 21.

(S1511)

First, the threshold value decision unit 212 acquires, through the dark image acquisition unit 211, a dark image generated by the dark image processing unit 120.

(S1512)

Next, the threshold value decision unit 212 computes the median of the brightness distribution of all pixels in the dark image.

(S1513)

Subsequently, the threshold value decision unit 212 decides the computed median as the threshold value.

Figure 23:
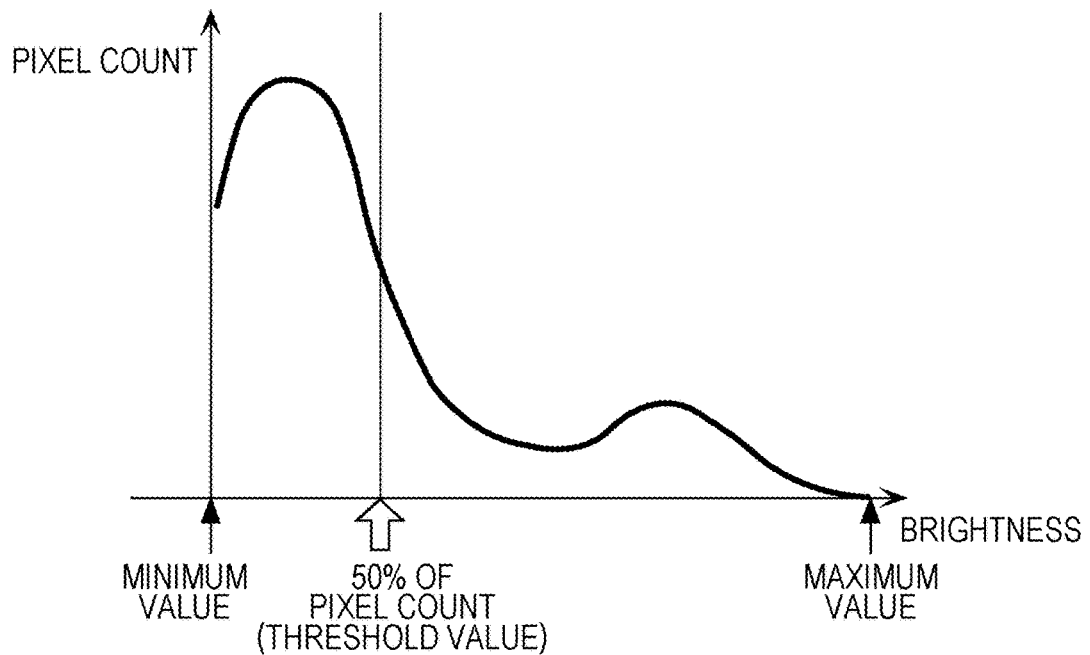
FIG. 23 illustrates the median of a brightness distribution of a dark image according to Embodiment 2.

FIG. 23 illustrates the median of the brightness distribution of a dark image.

As illustrated in FIG. 23, the threshold value decision unit 212 decides, as the threshold value for selecting the pixels to cluster, a threshold value that satisfies the condition whereby, in the brightness distribution of all pixels in the dark image, the number of pixels having a brightness less than or equal to the threshold value is 50% of the total number of pixels in the dark image.

Figure 24:
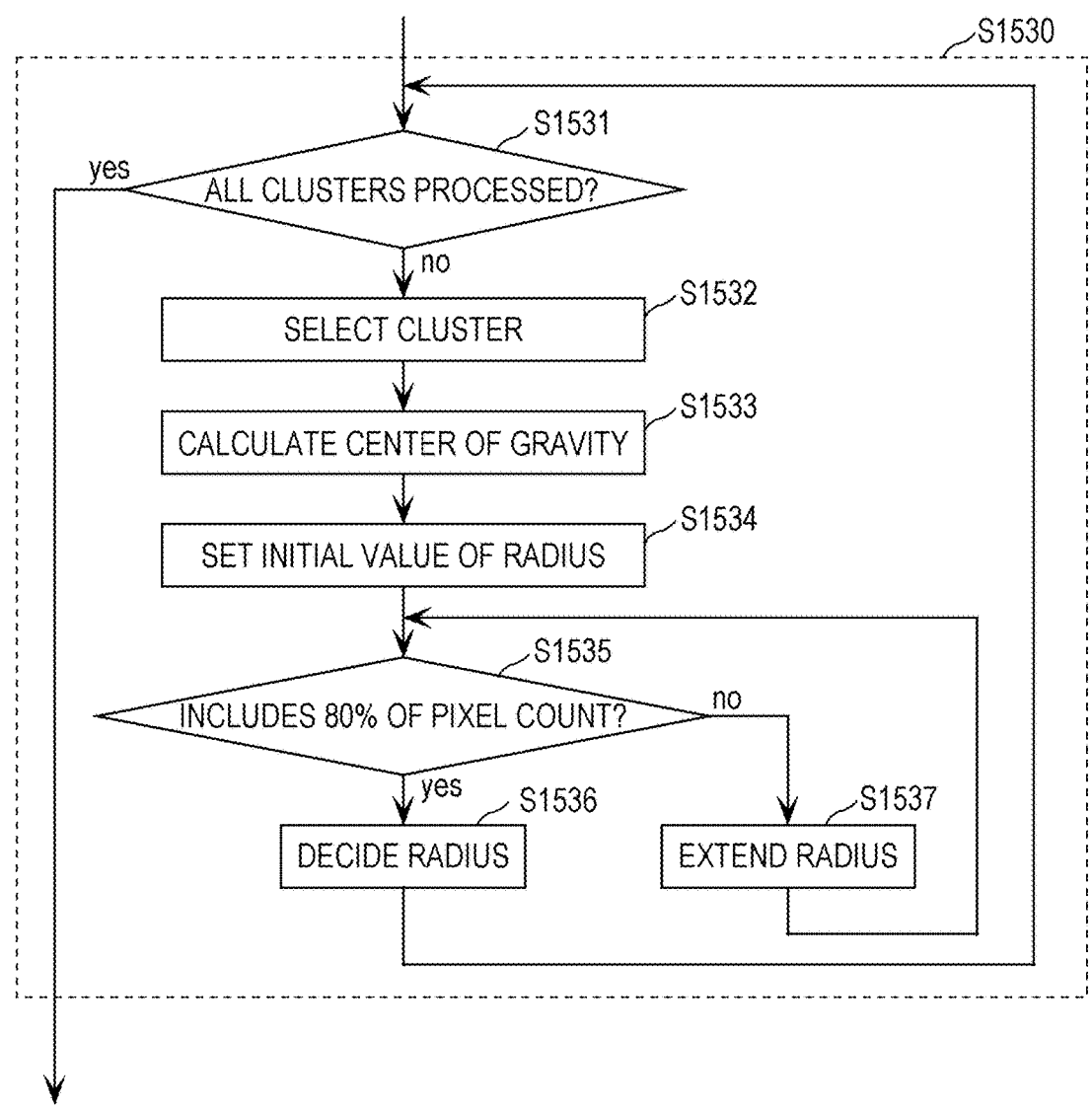
FIG. 24 is a flowchart illustrating an example of the operation of a center of gravity calculation unit and an outline estimation unit according to Embodiment 2.

FIG. 24 is a flowchart illustrating an example of the operation of the center of gravity calculation unit 215 and the outline estimation unit 216. In other words, FIG. 24 illustrates details regarding the process of step S1530 in the flowchart of FIG. 21.

(S1531)

The center of gravity calculation unit 215 determines whether or not an outline of a cell has been estimated for all clusters. At this point, if an outline of a cell has been estimated for all clusters (step S1531, yes), the cell position specification unit 210 proceeds to the process in step S1400.

(S1532)

In step S1531, if it is determined than an outline has not been estimated for all clusters (step S1531, no), the center of gravity calculation unit 215 selects one cluster corresponding to a cell for which an outline has not been estimated from among the clusters equal in number to the cell count.

(S1533)

The center of gravity calculation unit 215 computes the center of gravity position of the selected cluster, or in other words, the center of gravity position of the multiple pixels included in the cluster.

(S1534)

Next, the outline estimation unit 216 sets an initial radius of a circle.

(S1535)

Next, the outline estimation unit 216 determines whether or not 80% of all pixels in the cluster are included in a circle centered on the center of gravity position computed by the center of gravity calculation unit 215. In the case in which the process in step S1537 has not been conducted, the radius of the circle is the initial radius set by step S1534, whereas in the case in which the process in step S1537 has been conducted, the radius of the circle is a radius set by the process in the most recent step S1537.

(S1536)

If it is determined that 80% of the pixels are included (step S1535, yes), the outline estimation unit 216 decides the radius of the circle used in the determination of step S1535 as the radius of the outline of the cell. In other words, by deciding the center and radius of the circle, the outline of the cell is decided or estimated. After the outline of the cell is estimated in this way, the center of gravity calculation unit 215 repeats the process from step S1531.

(S1537)

On the other hand, if it is determined that 80% of the pixels are not included (step S1535, no), the outline estimation unit 216 re-sets the radius by extending the radius of the circle used in the determination of step S1535. Subsequently, the outline estimation unit 216 repeats the process from step S1535.

FIGS. 25A to 25E schematically illustrate a process of estimating an outline from a dark image.

Figure 25D:
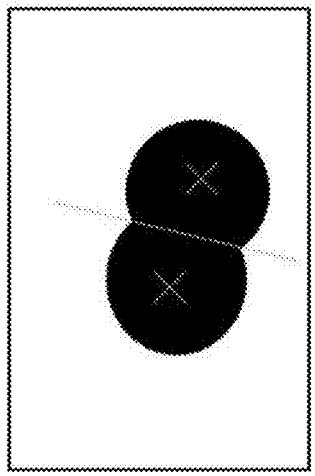
FIGS. 25A to 25E schematically illustrate a process of estimating an outline from a dark image according to Embodiment 2.
Figure 25E:
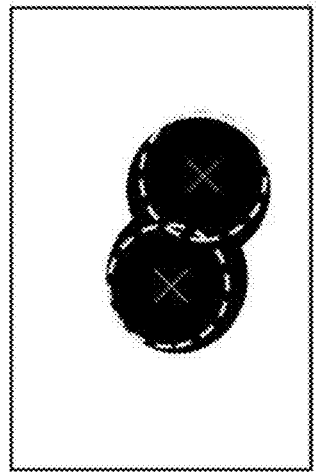
Figure 25A:
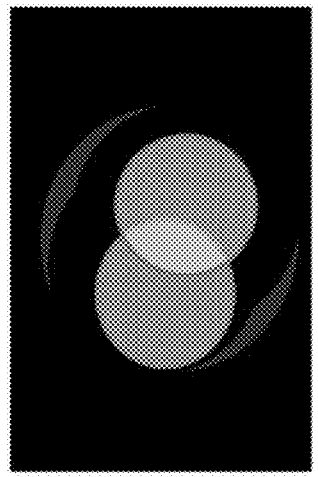
Figure 25B:
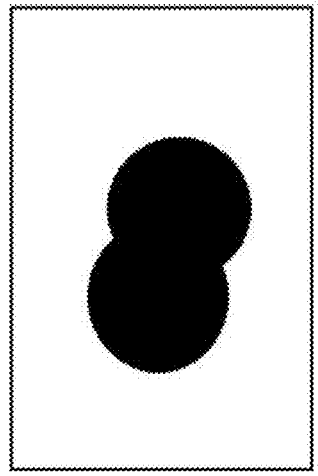

For example, the cell position specification unit 210 acquires the dark image illustrated in FIG. 25A, and uses the threshold value to select a set of pixels to cluster from all pixels included in the dark image, as illustrated in FIG. 25B.

Figure 25C:
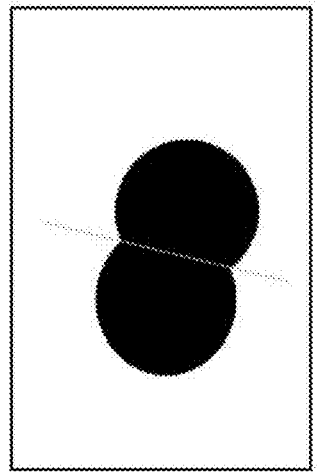

Next, the cell position specification unit 210 divides the set of pixels into a number of clusters equal to the cell count, as illustrated in FIG. 25C, and computes the center of gravity position of each cluster, as illustrated in FIG. 25D. Subsequently, the cell position specification unit 210 estimates the circumference of a circle centered on the center of gravity position as the outline of each cell, as illustrated in FIG. 25E.

Figure 26A:
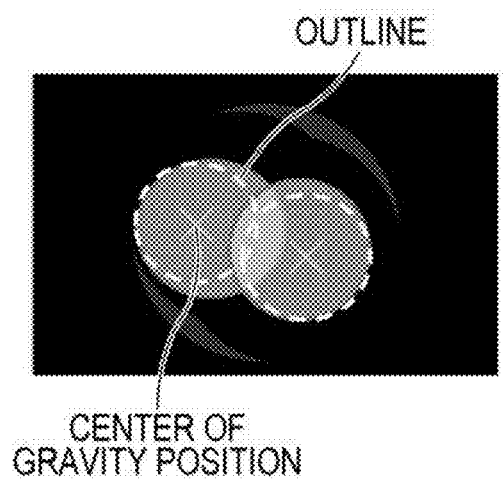
FIGS. 26A and 26B illustrate an example of a composite image generated by an image composition unit according to Embodiment 2.
Figure 26B:
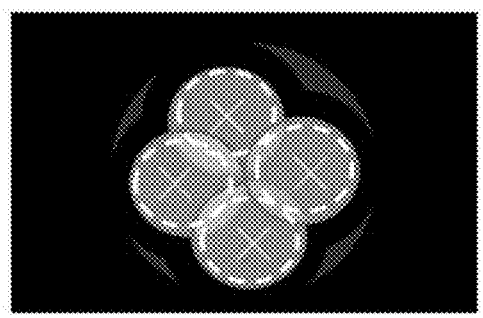

FIGS. 26A and 26B illustrate an example of a composite image generated by the image composition unit 217.

In the case in which the cell count is 2, the image composition unit 217 generates the composite image illustrated in FIG. 26A, for example. Also, in the case in which the cell count is 4, the image composition unit 217 generates the composite image illustrated in FIG. 26B, for example. In the examples illustrated in FIGS. 26A and 26B, x is a mark indicating the center of gravity position of each cell, while the dashed circumference indicates the outline of each cell.

[Advantageous Effects]

In a dark image, cells are photographed with uniformly high brightness by scattered light. The scattering materials inside the cells are the fine structures inside the cells. Even inside an embryo, fine structures outside the cells are extremely few, and light is not scattered. In other words, even inside an embryo, only the cells become photographed with high brightness. Accordingly, by extracting pixels having a brightness equal to or greater than a threshold value from the dark image, and additionally clustering the extracted pixels, the positions of multiple cells can be specified accurately.

Embodiment 3

In Embodiment 1, each pixel is imaged over the sequence of one or more periods of a bright segment and a dark segment, and for each pixel position, the minimum brightness value is extracted from multiple images, and the brightness of the pixel at that pixel position is computed. Also, in Embodiment 2, the arrangement of objects is specified with the brightness distribution of the acquired dark image. In Embodiment 3, an abnormality of a cell is determined from the amount of fine structures inside an object with the brightness of the dark image generated by the dark image process of Embodiment 1. Hereinafter, Embodiment 3 will be described in detail.

Figure 27:
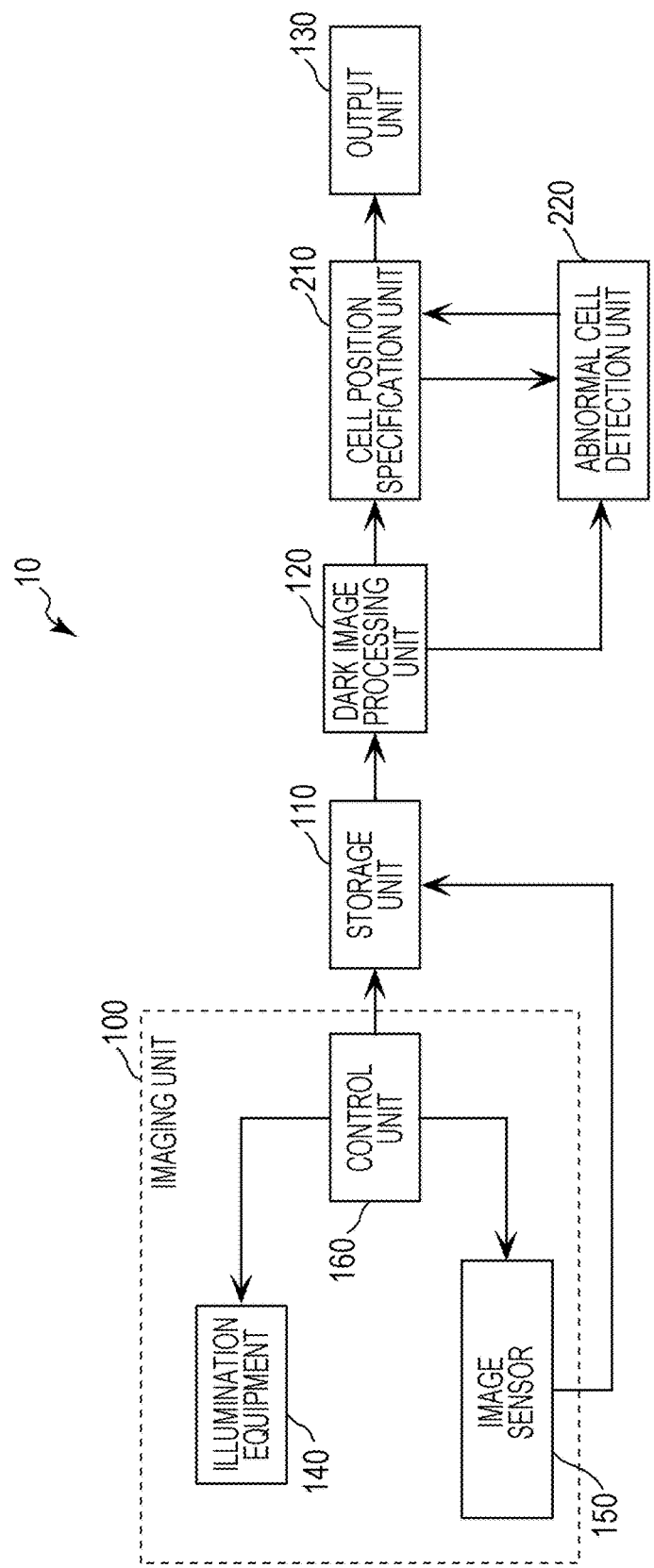
FIG. 27 is a function block diagram of an image generating apparatus according to Embodiment 3.

FIG. 27 is a function block diagram of the image generating apparatus 10 according to Embodiment 3.

The image generating apparatus 10 according to Embodiment 3 is provided with all of the structural elements of the image generating apparatus 10 of Embodiment 1, and additionally is provided with an abnormal cell detection unit 220. Note that the abnormal cell detection unit 220 is realized by a processing circuit, similarly to the dark image processing unit 120.

[Abnormal Cell Detection Unit]

The abnormal cell detection unit 220 acquires a dark image from the dark image processing unit 120, and additionally acquires an outline of each cell estimated by the cell position specification unit 210. Subsequently, the abnormal cell detection unit 220 specifies a cell region enclosed by each outline from the dark image, and detects an abnormality of the cell corresponding to the cell region. In other words, in the present embodiment, the material which treated as the object is an embryo that includes multiple cells. Additionally, the abnormal cell detection unit 220 (a1) extracts multiple cell regions having a brightness equal to or greater than a first threshold value in the dark image, that is, the third image, (a2) determines whether or not the brightness of each of the multiple cell regions is within a second range, and (a3) outputs the determination result.

Figure 28:
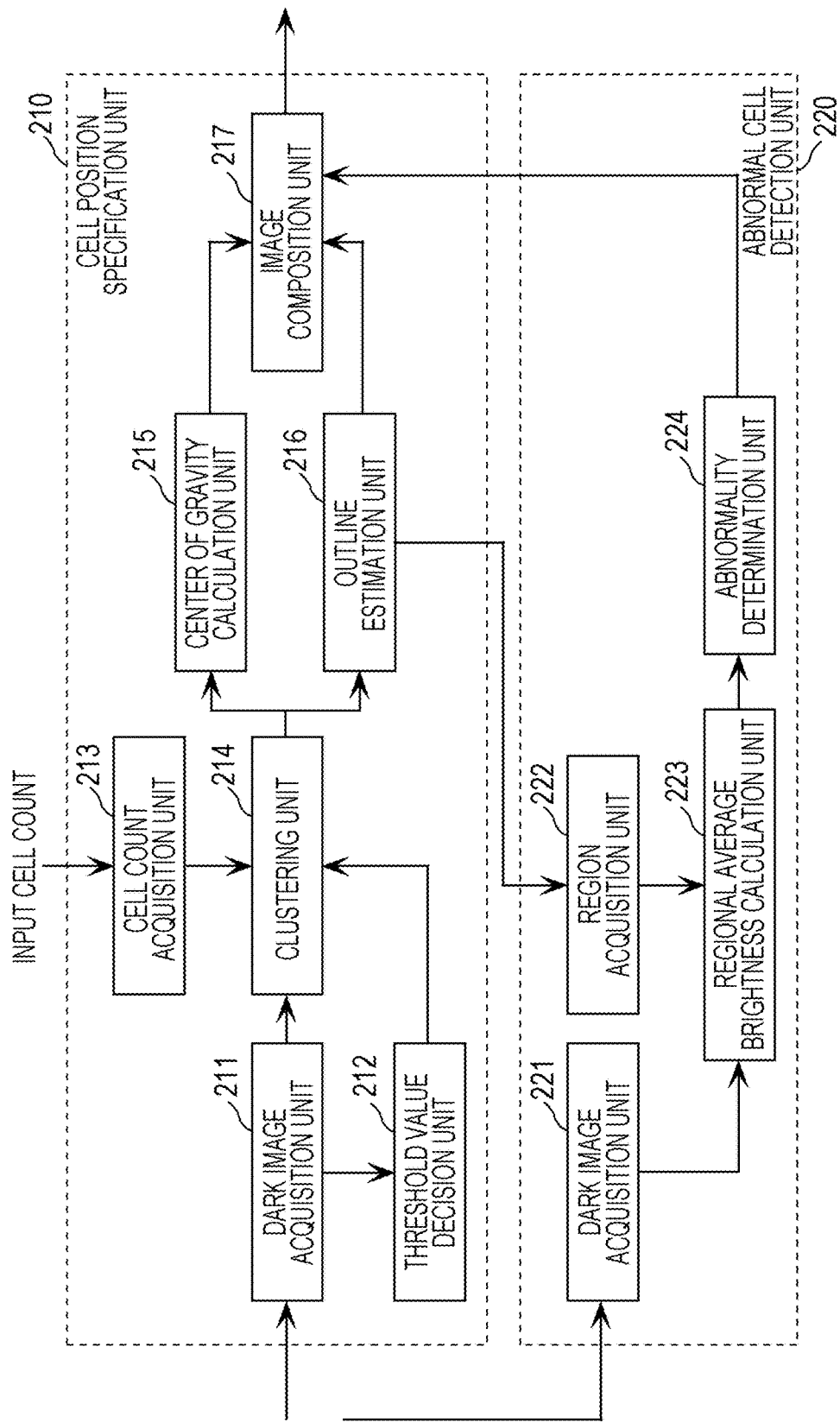
FIG. 28 is a function block diagram illustrating a detailed configuration of an abnormal cell detection unit according to Embodiment 3.

FIG. 28 is a function block diagram illustrating a detailed configuration of the abnormal cell detection unit 220. As illustrated in FIG. 28, the abnormal cell detection unit 220 is provided with a dark image acquisition unit 221, a region acquisition unit 222, a regional average brightness calculation unit 223, and an abnormality determination unit 224.

The dark image acquisition unit 221 acquires a dark image generated by the dark image processing unit 120.

The region acquisition unit 222 acquires all estimated outlines from the outline estimation unit 216 of the cell position specification unit 210. Each outline is defined by a center of circumference and a radius.

The regional average brightness calculation unit 223 specifies, from the dark image, each cell region enclosed by each of all outlines acquired by the region acquisition unit 222. Subsequently, the regional average brightness calculation unit 223 computes the average brightness value of each of all of the specified cell regions.

The abnormality determination unit 224 uses the average brightness value computed by the regional average brightness calculation unit 223 to determine whether or not the cell corresponding to each of all of the cell regions is abnormal. Specifically, the abnormality determination unit 224 computes the average of the average brightness values for each of all of the cell regions, and additionally computes the standard deviation. Subsequently, the abnormality determination unit 224 determines that a cell corresponding to a cell region having an average brightness value smaller than "overall average value–standard deviation (SD)" is abnormal.

Also, in the case of three or fewer cell regions, the abnormality determination unit 224 selects the maximum value from among the average brightness values for each of all of the cell regions, and determines that a cell corresponding to a cell region having an average brightness falling below a fixed value from the maximum value is abnormal. For example, the abnormality determination unit 224 determines that a cell corresponding to a cell region having an average brightness value less than or equal to 60% of the maximum value is abnormal.

In this way, in the case in which the brightness of each of the multiple cell regions is within the second range, the abnormality determination unit 224 outputs a determination result indicating that the multiple cells are normal, whereas in the case in which the brightness of each of the multiple cell regions is outside the second range, the abnormality determination unit 224 outputs a determination result indicating that the multiple cells are abnormal.

Note that in the example described above, to determine abnormality or not, the average brightness values of the cell regions are compared, but the variance of the brightness for each of all cell regions may also be compared. In the case of comparing the variance or the standard deviation of the brightness, if the variance or the standard deviation of a cell region is equal to or greater than a fixed amount from the variance or the standard deviation of the other cell regions, the abnormality determination unit 224 determines that the cell corresponding to the relevant cell region is abnormal.

Figure 29:
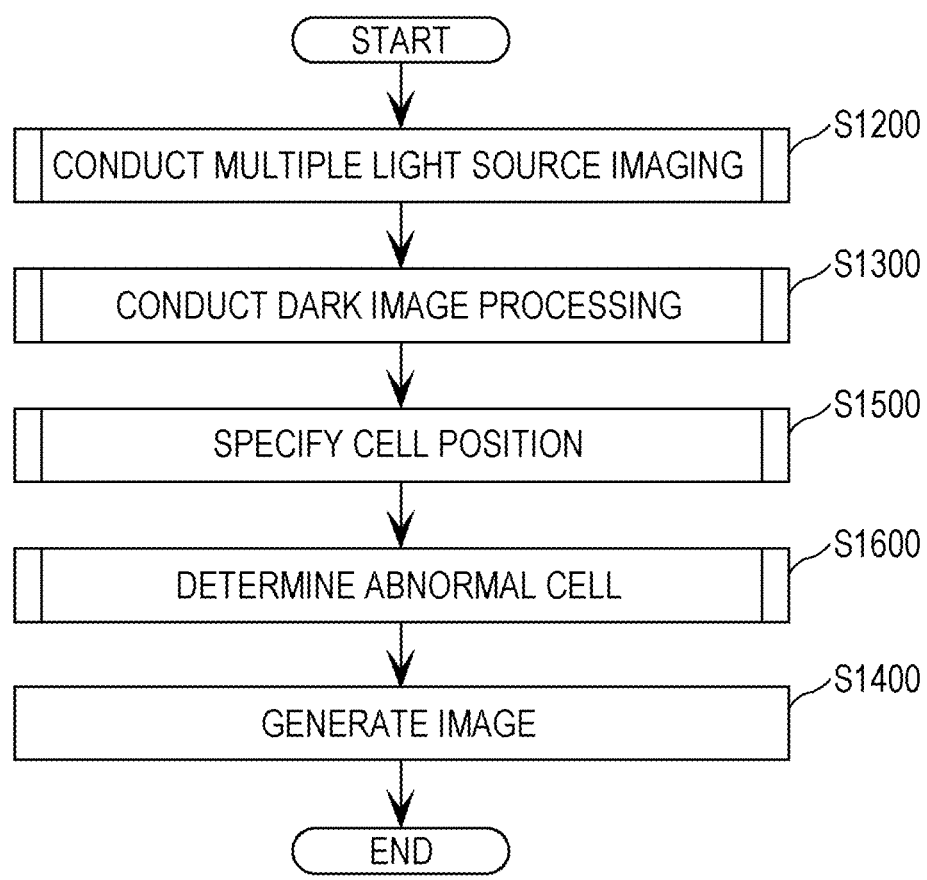
FIG. 29 is a flowchart illustrating an example of the operation of an image generating apparatus according to Embodiment 3.

FIG. 29 is a flowchart illustrating an example of the operation of the image generating apparatus 10 according to Embodiment 3.

(S1600)

The image generating apparatus 10 conducts the processes from step S1200 to S1500 similarly to Embodiment 2, and additionally determines whether or not each cell corresponding to each cell region in the dark image is abnormal.

At this point, the operation of the abnormal cell detection unit 220 in step S1600 illustrated in FIG. 29 will be described in detail.

Figure 30:
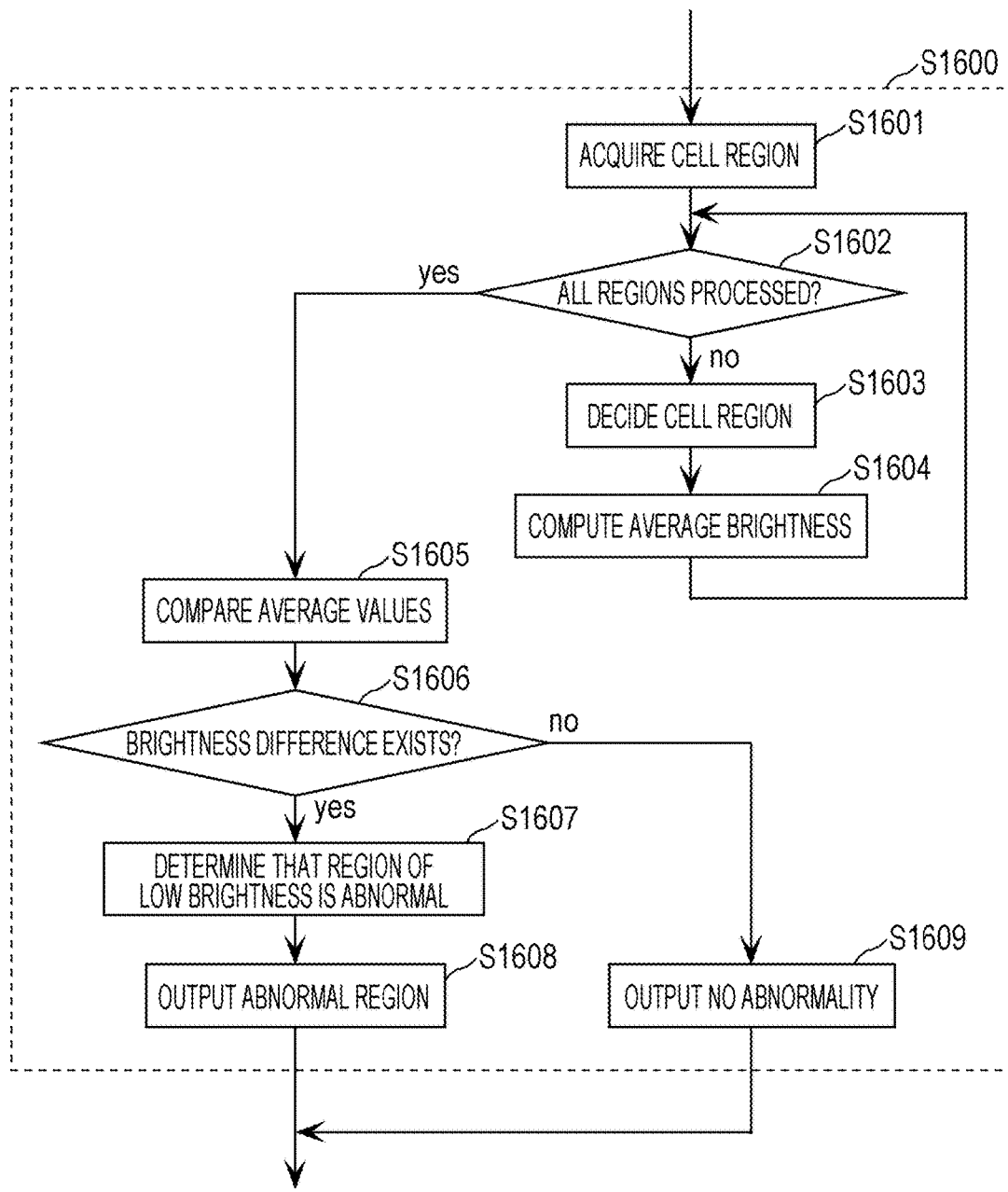
FIG. 30 is a flowchart illustrating an example of the operation of an abnormal cell detection unit according to Embodiment 3.

FIG. 30 is a flowchart illustrating an example of the operation of the abnormal cell detection unit 220.

(S1601)

First, the dark image acquisition unit 221 acquires a dark image from the dark image processing unit 120, and the region acquisition unit 222 acquires all outlines estimated by the outline estimation unit 216 of the cell position specification unit 210. Subsequently, the regional average brightness calculation unit 223 acquires, from the dark image, each cell region enclosed by each of all of the outlines.

(S1602)

Next, the regional average brightness calculation unit 223 determines whether or not the process of computing the average brightness value has finished for all of the cell regions.

(S1603)

If it is determined that the process has not finished for all of the cell regions (step S1602, no), the regional average brightness calculation unit 223 decides one cell region whose average brightness value has not been computed from among all of the cell regions.

(S1604)

Subsequently, the regional average brightness calculation unit 223 computes the average brightness value of the decided cell region, and repeats the process from step S1602.

(S1605)

On the other hand, in step S1602, if it is determined that the process of computing the average brightness value has finished for all of the cell regions (step S1602, yes), the abnormality determination unit 224 compares the average brightness value for each of all of the cell regions to a determination value. The determination value is "overall average value–standard deviation (SD)", for example.

(S1606)

By the comparison of step S1605, the abnormality determination unit 224 determines whether or not the average brightness value for each of all of the cell regions is less than the determination value (step S1606).

(S1607)

If it is determined that the average brightness value of any cell region is less than the determination value (step S1606, yes), the abnormality determination unit 224 determines that the cell corresponding to the relevant cell region is abnormal.

(S1608)

Subsequently, the abnormality determination unit 224 notifies the image composition unit 217 of the cell position specification unit 210 that the cell is abnormal. In other words, the abnormality determination unit 224 outputs the cell region determined to be abnormal to the image composition unit 217 as an abnormal region.

(S1609)

On the other hand, in step S1606, if it is determined that the average brightness values of all cell regions are all equal to or greater than the determination value (step S1606, no), the abnormality determination unit 224 notifies the image composition unit 217 of the cell position specification unit 210 that no cell region is abnormal. In other words, the abnormality determination unit 224 outputs no abnormality to the image composition unit 217.

Figure 31:
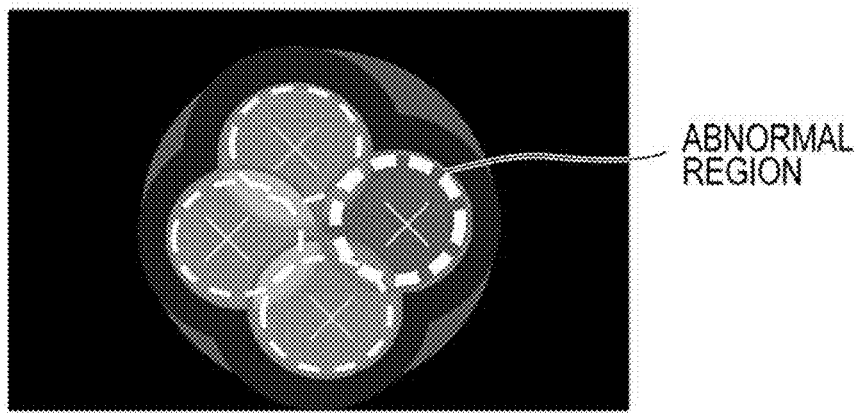
FIG. 31 illustrates an example of a composite image generated by an image composition unit according to Embodiment 3.

FIG. 31 illustrates an example of a composite image generated by the image composition unit 217.

The image composition unit 217 acquires an abnormal region from the abnormality determination unit 224 of the abnormal cell detection unit 220, and generates a composite image in which the outline of the abnormal region is emphasized, as illustrated in FIG. 31. In addition, the image composition unit 217 may also generate a composite image in which the mark indicating the center of gravity position of the abnormal region is emphasized. The image composition unit 217 may emphasize the outline or the mark (for example, x) indicating the center of gravity position by thickening the lines of the outline or mark. Additionally, the image composition unit 217 may also generate a composite image in which the abnormal region is indicated by a color different from the other cell regions. Additionally, the image composition unit 217 may also generate a composite image in which the abnormal region is indicated by blinking.

[Advantageous Effects]

The state inside a cell is not known from an outline indicating the shape of the cell membrane. It has been necessary to use fluorescent staining to confirm the amount of fine structures inside a cell. In Embodiment 3, fine structures inside a cell cannot be observed directly, but the amount of fine structures inside a cell can be observed as the brightness of a dark image. With this arrangement, it is possible to estimate the favorable or unfavorable state of a cell from the amount of fine structures inside the cell, without performing a process such as staining with respect to the cell.

Modification of Embodiment 3

In the present modification, the abnormal cell detection unit 220 stores a predetermined determination value as brightness determination criteria.

Figure 32:
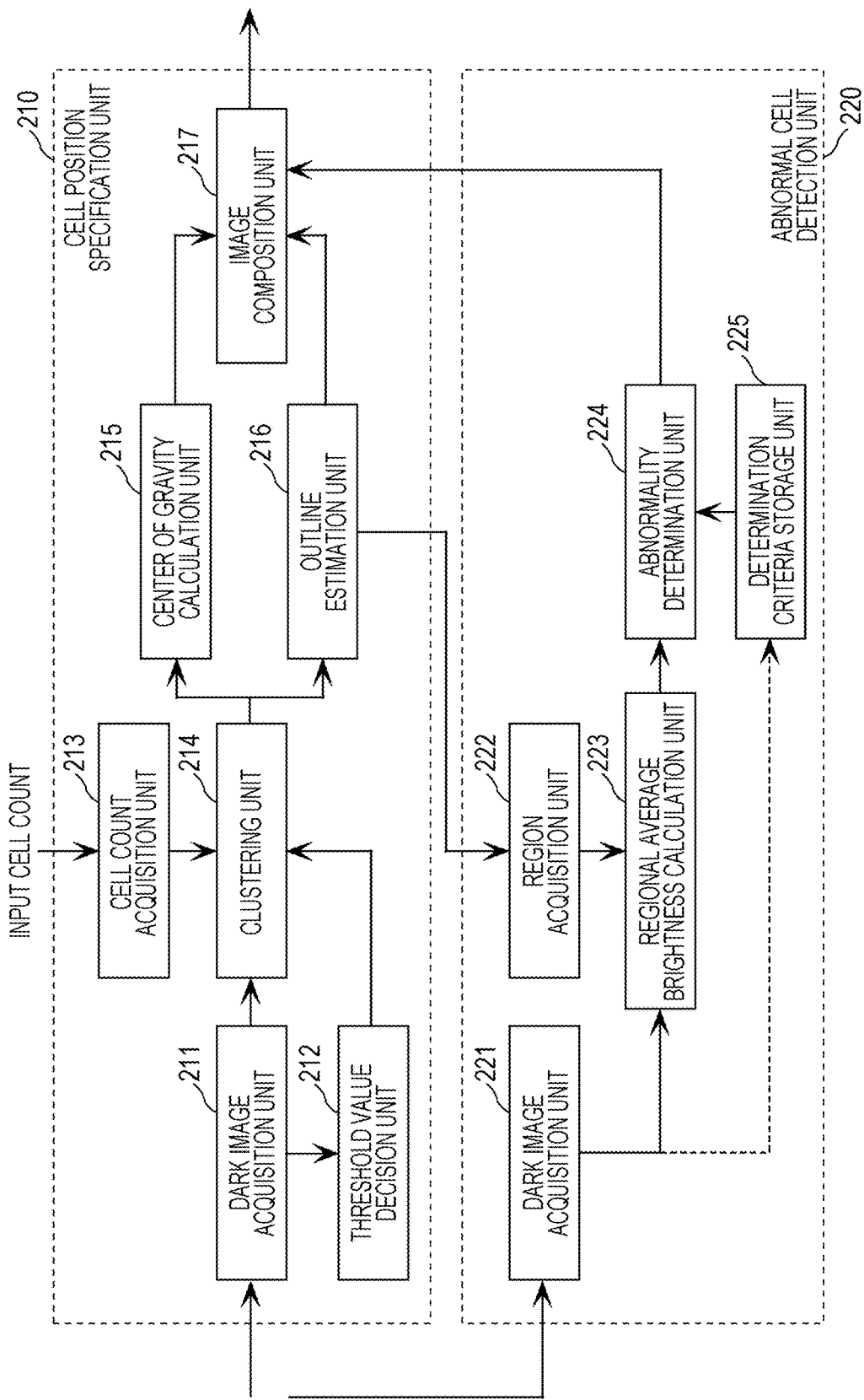
FIG. 32 is a function block diagram illustrating a detailed configuration of an abnormal cell detection unit according to a modification of Embodiment 3.

FIG. 32 is a function block diagram illustrating a detailed configuration of the abnormal cell detection unit 220 according to the modification of Embodiment 3. As illustrated in FIG. 32, the abnormal cell detection unit 220 according to the present modification is provided with all of the structural elements of the abnormal cell detection unit 220 of Embodiment 3 above, and in addition, is provided with a determination criteria storage unit 225.

The determination criteria storage unit 225 stores a predetermined brightness determination value (for example, 1300).

In the case in which the average brightness value of a cell region falls below the determination value, for example, the abnormality determination unit 224 judges that the cell corresponding to the cell region is abnormal.

Figure 33:
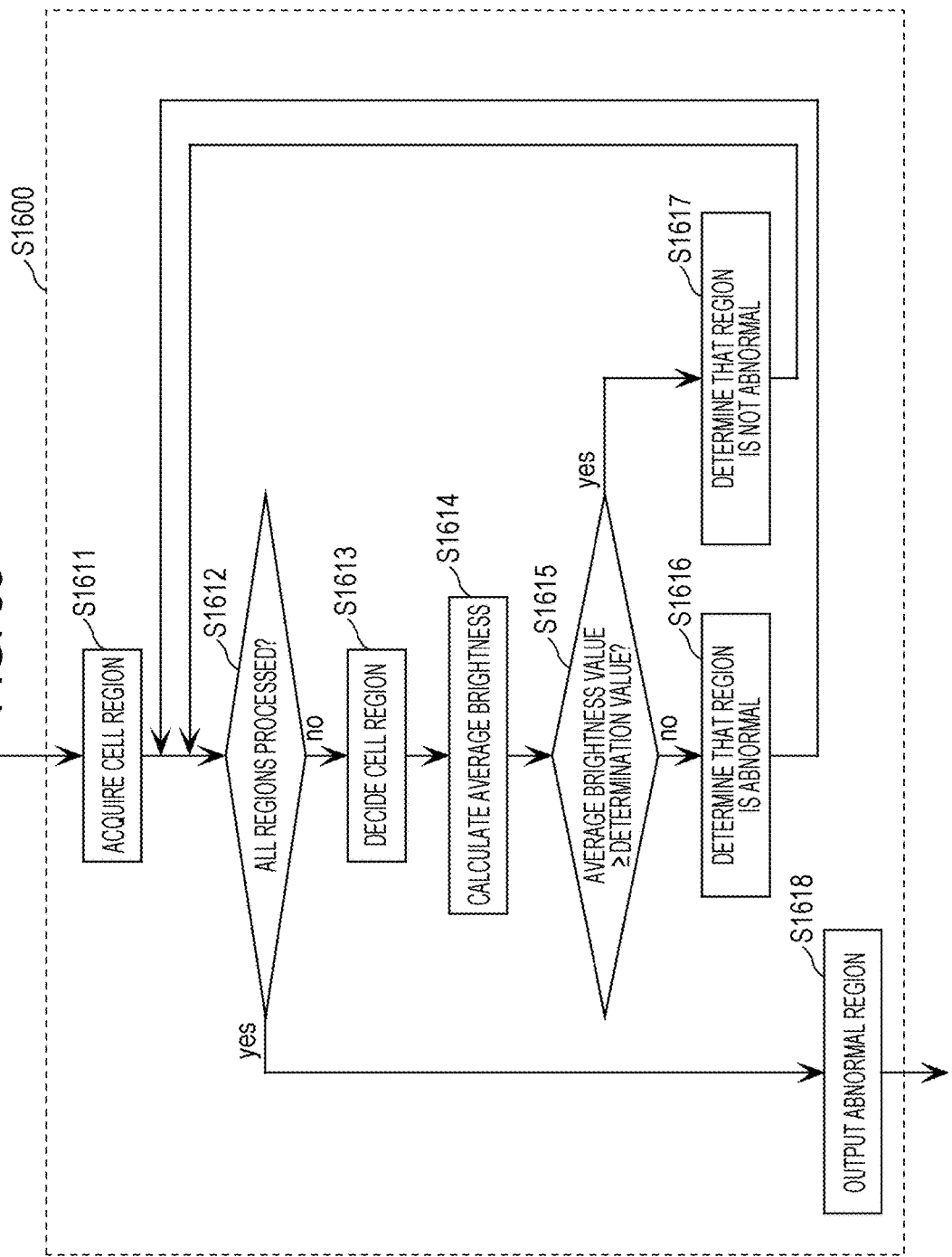
FIG. 33 is a flowchart illustrating an example of the operation of an abnormal cell detection unit according to a modification of Embodiment 3.

FIG. 33 is a flowchart illustrating an example of the operation of the abnormal cell detection unit 220 according to the present modification.

(S1611)

First, the dark image acquisition unit 221 acquires a dark image from the dark image processing unit 120, and the region acquisition unit 222 acquires all outlines estimated by the outline estimation unit 216 of the cell position specification unit 210. Subsequently, the regional average brightness calculation unit 223 acquires, from the dark image, each cell region enclosed by each of all of the outlines.

(S1612)

Next, the regional average brightness calculation unit 223 determines whether or not the process of determining the presence or absence of an abnormality has finished for all of the cell regions.

(S1613)

If it is determined that the process has not finished for all of the cell regions (step S1612, no), the regional average brightness calculation unit 223 decides one cell region on which the determination process has not been conducted from among all of the cell regions.

(S1614)

Subsequently, the regional average brightness calculation unit 223 computes the average brightness value of the decided cell region.

(S1615)

Next, the abnormality determination unit 224 acquires the determination value from the determination criteria storage unit 225, and determines whether or not the computed average brightness value of the cell region is equal to or greater than the determination value.

(S1616)

If it is determined that the average brightness value of the cell region is less than the determination value (step S1615, no), the abnormality determination unit 224 determines that the cell corresponding to the relevant cell region is abnormal. Subsequently, the abnormal cell detection unit 220 repeats the process from step S1612.

(S1617)

On the other hand, if it is determined that the average brightness value of the cell region is equal to or greater than the determination value (step S1615, yes), the abnormality determination unit 224 determines that the cell corresponding to the relevant cell region is not abnormal. Subsequently, the abnormal cell detection unit 220 repeats the process from step S1612.

(S1618)

In step S1612, if it is determined that the process of determining the presence or absence of an abnormality has finished for all cell regions (step S1612, yes), the abnormality determination unit 224 outputs the result determined by steps S1616 and S1617 to the image composition unit 217 of the cell position specification unit 210. In other words, in the case in which one of the cells is determined to be abnormal in step S1616, the abnormality determination unit 224 outputs the cell region of the abnormal cell to the image composition unit 217 as an abnormal region.

At this point, the determination criteria storage unit 225 may also derive a determination value from the dark image instead of using a predetermined determination value.

Figure 34:
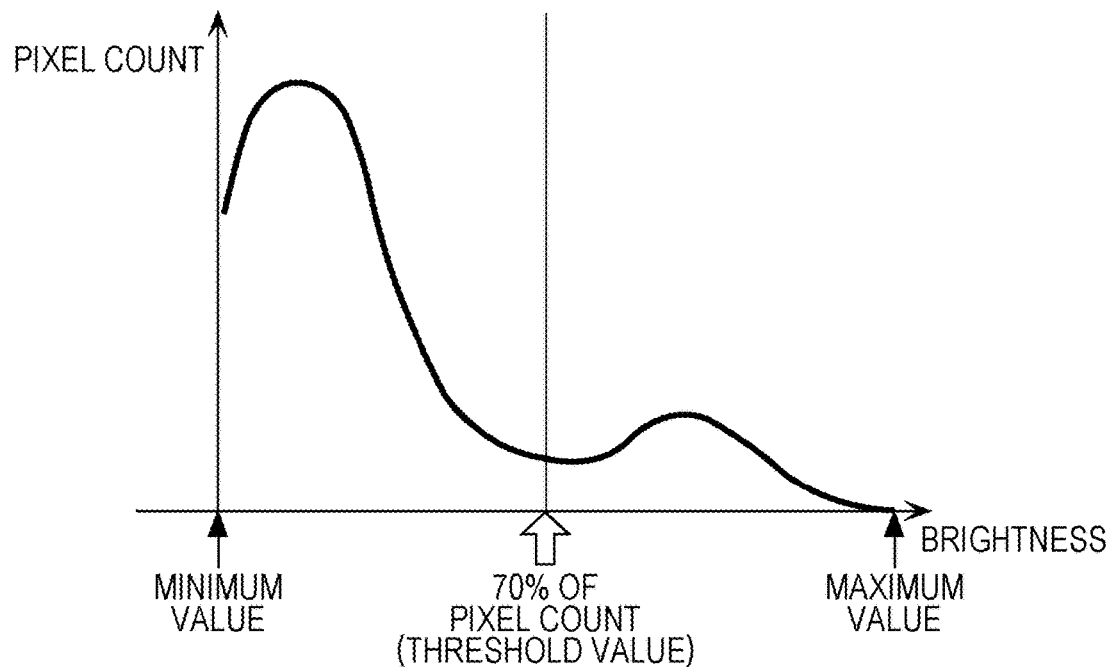
FIG. 34 illustrates a brightness distribution of a dark image according to a modification of Embodiment 3.

FIG. 34 illustrates the brightness distribution of a dark image.

As illustrated in FIG. 34, the determination criteria storage unit 225 computes, as the determination value for determining the presence or absence of an abnormality of a cell, a determination value that satisfies the condition whereby, in the brightness distribution of all pixels in the dark image, the number of pixels having a brightness value less than or equal to the determination value is 70% of the total number of pixels in the dark image.

Figure 35:
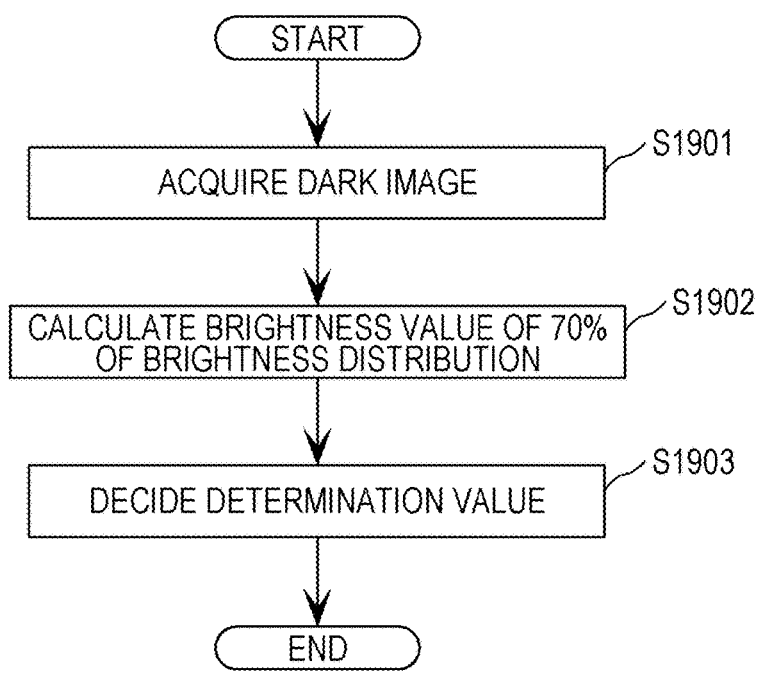
FIG. 35 is a flowchart illustrating an example of the operation of a determination criteria storage unit according to a modification of Embodiment 3.

FIG. 35 is a flowchart illustrating an example of the operation of the determination criteria storage unit 225.

(S1901)

The determination criteria storage unit 225 acquires a dark image from the dark image processing unit 120 through the dark image acquisition unit 221.

(S1902)

Next, on the basis of the brightness distribution in the dark image, the determination criteria storage unit 225 computes a set brightness value that satisfies the condition whereby the number of pixels having a brightness value less than or equal to the set brightness value is 70% of the total number of pixels in the dark image.

(S1903)

The determination criteria storage unit 225 decides the computed set brightness value as the determination value for determining the presence or absence of an abnormality in a cell.

Embodiment 4

In Embodiment 4, the density of a cell region is specified and displayed for each of at least one cell region.

Figure 36:
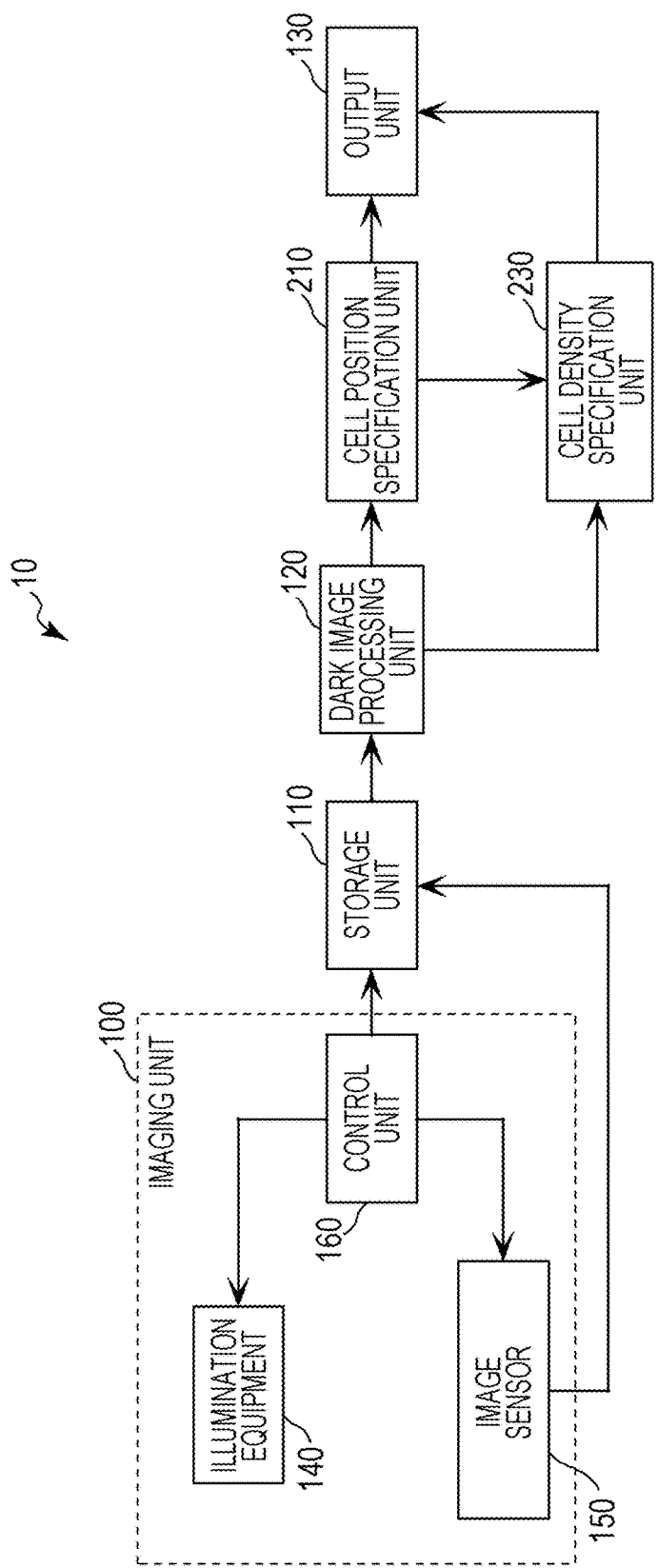
FIG. 36 is a function block diagram of an image generating apparatus according to Embodiment 4.

FIG. 36 is a function block diagram of the image generating apparatus 10 according to Embodiment 4.

The image generating apparatus 10 according to Embodiment 4 is provided with all of the structural elements of the image generating apparatus 10 of Embodiment 2, and additionally is provided with a cell density specification unit 230. Note that the cell density specification unit 230 is realized by a processing circuit, similarly to the dark image processing unit 120.

[Cell Position Specification Unit]

The cell density specification unit 230 acquires a dark image from the dark image processing unit 120, and additionally acquires an outline of each cell estimated by the cell position specification unit 210. Subsequently, on the basis of the brightness of the cell region enclosed by each outline, the cell density specification unit 230 specifies the density of the cell corresponding to the cell region, and displays the density. In other words, in the present embodiment, the material which treated as the object is an embryo that includes cells. Subsequently, the cell density specification unit 230 (b1) extracts a cell region having a brightness equal to or greater than a first threshold value in the dark image, that is, the third image, and (b2) computes the density of the cell on the basis of the brightness of the cell region.

Figure 37:
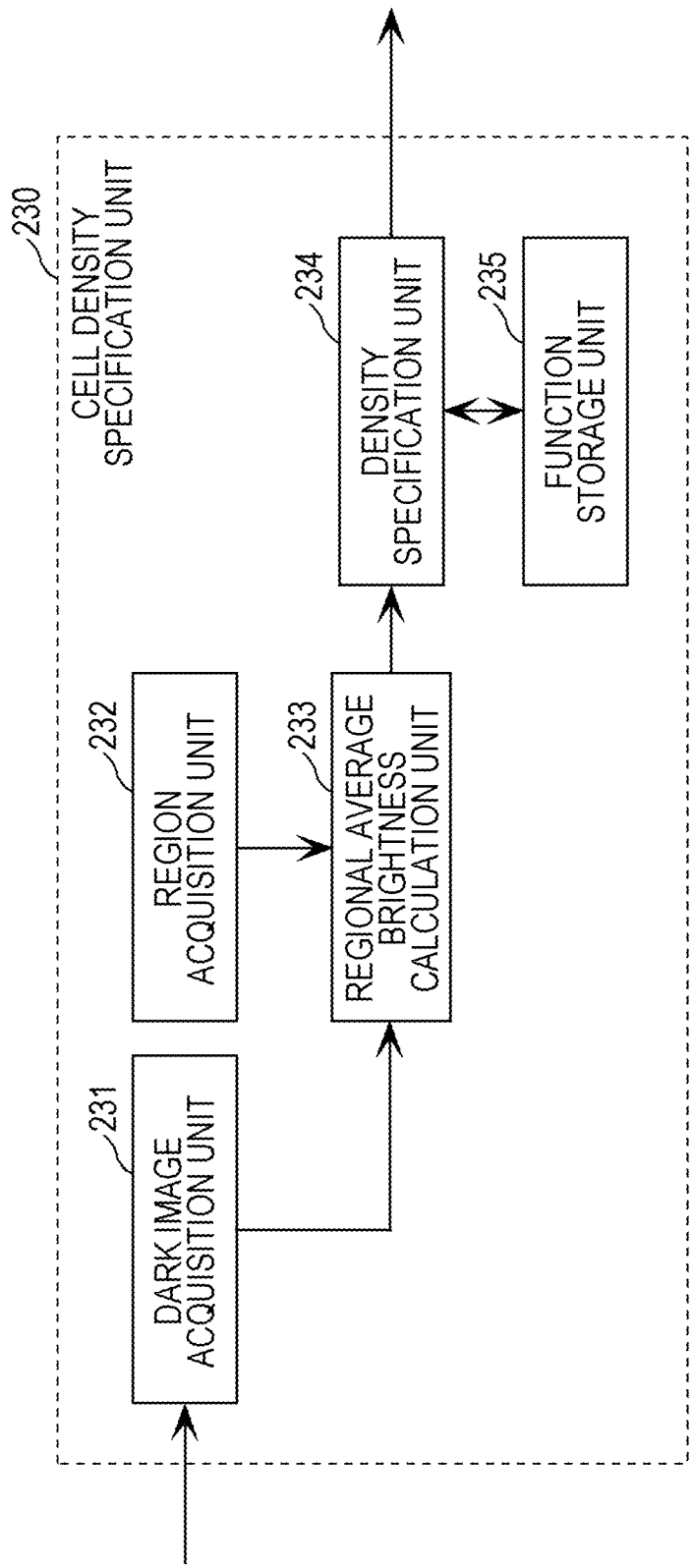
FIG. 37 is a function block diagram illustrating a detailed configuration of a cell density specification unit according to Embodiment 4.

FIG. 37 is a function block diagram illustrating a detailed configuration of the cell density specification unit 230. As illustrated in FIG. 37, the cell density specification unit 230 is provided with a dark image acquisition unit 231, a region acquisition unit 232, a regional average brightness calculation unit 233, a density specification unit 234, and a function storage unit 235.

The dark image acquisition unit 231 acquires a dark image generated by the dark image processing unit 120.

The region acquisition unit 232 acquires all estimated outlines from the outline estimation unit 216 of the cell position specification unit 210. Each outline is defined by a center of circumference and a radius.

The regional average brightness calculation unit 233 specifies, from the dark image, each cell region enclosed by each of all outlines acquired by the region acquisition unit 222. Subsequently, the regional average brightness calculation unit 233 computes the average brightness value of each of all of the specified cell regions.

The function storage unit 235 stores a function that indicates a function between average brightness value and cell density, the function being set in advance by measurement. Note that instead of storing the function, the function storage unit 235 may also store a correspondence table indicating the function.

The density specification unit 234 reads out the function from the function storage unit 235. Subsequently, the density specification unit 234 references the function to specify the density corresponding to the average brightness value of each of all cell regions computed by the regional average brightness calculation unit 233. The density specification unit 234 outputs the density specified for each of all cell regions to the output unit 130.

Figure 38:
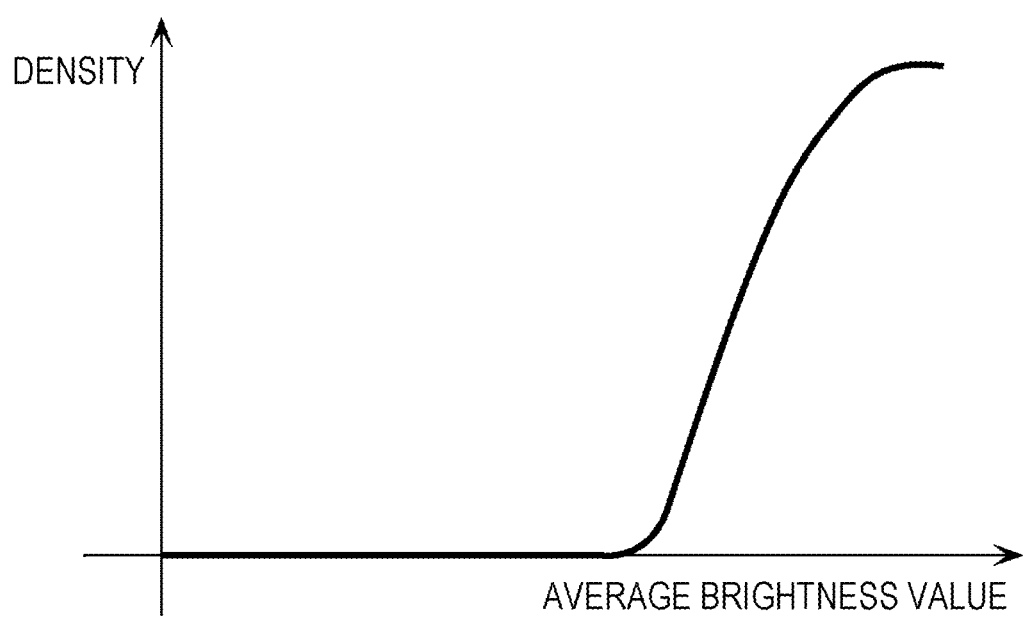
FIG. 38 illustrates an example of a function stored in a function storage unit according to Embodiment 4.

FIG. 38 illustrates an example of the function stored in the function storage unit 235.

The function stored in the function storage unit 235 indicates 100% as the density corresponding to the average brightness value of a normal cell. Also, the function indicates a proportion less than 100% as the density corresponding to the average brightness value of a cell that is not normal. Herein, a cell that is not normal refers to a cell in which the amount of specific materials (such as mitochondria or microtubules) among the multiple fine structures included in a normal cell has been reduced by a drug empirically. In other words, the function indicates an association between the average brightness value empirically measured with respect to such a cell, and the proportion of the amount of materials reduced in the cell. In addition, the function storage unit 235 may also store functions corresponding to individual cell types (such as early embryos, cartilage cells, cardiac muscle cells, or nerve cells, for example).

Figure 39A:
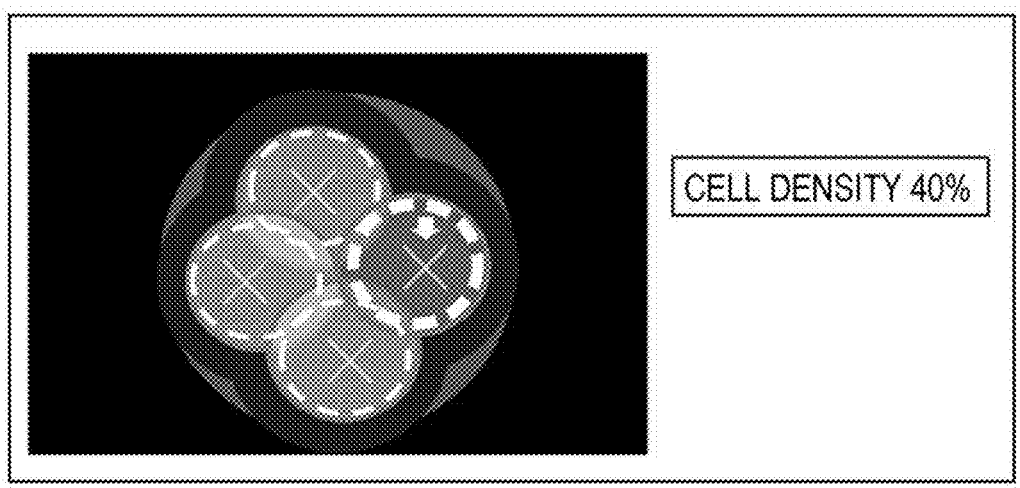
FIG. 39A illustrates an example of a composite image displayed by an output unit according to Embodiment 4.
Figure 39B:
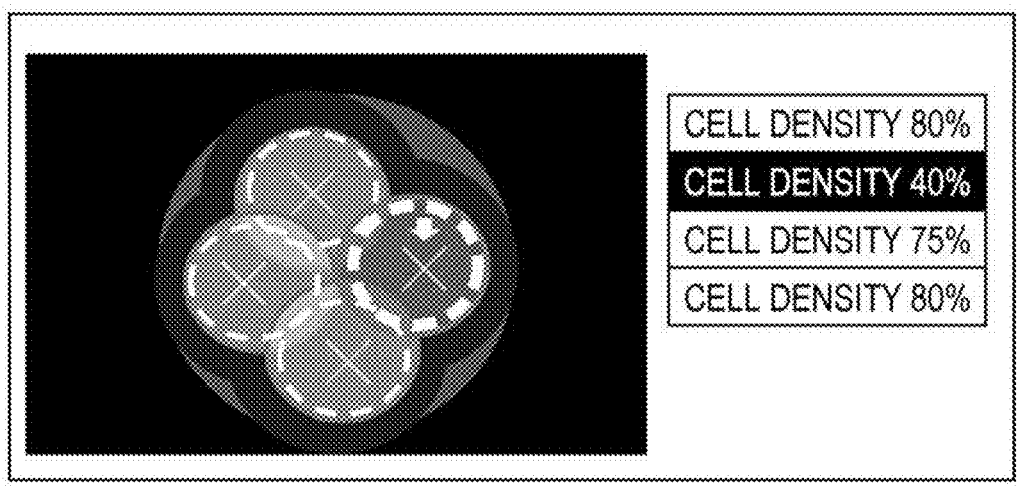
FIG. 39B illustrates an example of a composite image displayed by an output unit according to Embodiment 4.

FIGS. 39A and 39B illustrate an example of a composite image displayed by the output unit 130 according to Embodiment 4.

For example, as illustrated in FIG. 39A, the output unit 130 displays a dark image on which a mark and an outline indicating the center of gravity position of each cell region, and a cursor are superimposed. The output unit 130 moves the cursor in response to operations by a user, and displays the specified density (for example, 40%) for the cell region under the cursor as the cell density. Also, in the case in which the cell density corresponds to an abnormal value, the output unit 130 emphasizes the display of the cell region corresponding to the cell density. An abnormal value is a density less than or equal to 60%, for example. In addition, when emphasizing a cell region, the output unit 130 emphasizes the cell region by changing the color of the outline of the cell region, highlighting the outline, or causing the outline to blink.

Additionally, as illustrated in FIG. 39B, for example, the output unit 130 may also display a dark image in which a mark and an outline indicating the center of gravity position of each cell region, and a cursor are superimposed, while in addition, the specified densities for all cell regions are displayed as the cell densities. In this case, the output unit 130 moves the cursor in response to operations by a user, and emphasizes the cell density being displayed for the cell region under the cursor. For example, the output unit 130 highlights the relevant cell density. Additionally, the output unit 130 may also emphasize the display of the cell region under the cursor.

[Advantageous Effects]

It has been necessary to use fluorescent staining to confirm the amount of fine structures inside a cell. In Embodiment 4, a function obtained by empirically measuring the relationship between the brightness of a dark image and the amount of fine structures inside a cell is prepared in advance and referenced, thereby making it possible to estimate the density of fine structures inside a cell only through observation by visible light, without performing a process such as staining. With this arrangement, the favorable or unfavorable state of a cell can be estimated.

Other Embodiments

The foregoing thus describes an image generating device according to one or more aspects on the basis of respective embodiments and their modifications, but the present disclosure is not limited to these respective embodiments and their modifications. Embodiments obtained by applying various modifications that may occur to persons skilled in the art to the foregoing respective embodiments or a modification thereof, as well as embodiments constructed by combining structural elements from different embodiments, may also be included in the scope of the present disclosure insofar as such embodiments do not depart from the gist of the present disclosure.

Note that, in the foregoing respective embodiments and respective modifications, each structural element may be configured by dedicated hardware, or realized by executing a software program suited to each structural element. Each structural element may be realized as a result of a program execution unit such as a CPU or processor reading out and executing a software program recorded on a recording medium such as a hard disk or semiconductor memory. Herein, software realizing a configuration such as the image generating apparatus according to the foregoing respective embodiments or respective modifications is a program causing a computer to execute each step included in the flowcharts illustrated in FIG. 12, FIG. 13, FIG. 16, FIGS. 20 to 22, FIG. 24, FIG. 29, FIG. 30, FIG. 33, and FIG. 35.

Also, in the present disclosure, all or part of the units and devices, or all or part of the function blocks in the block diagrams illustrated in FIG. 2, FIG. 9, FIG. 18, FIG. 19, FIG. 27, FIG. 28, FIG. 32, FIG. 36, and FIG. 37, may also be executed by one or multiple electronic circuits, including a semiconductor device, a semiconductor integrated circuit (IC), or a large-scale integration (LSI) chip. An LSI chip or IC may be integrated into a single chip, or be configured by combining multiple chips. For example, function blocks other than storage elements may be integrated into a single chip. Although referred to as an LSI chip or IC herein, such electronic circuits may also be called a system LSI chip, a very-large-scale integration (VLSI) chip, or an ultra-large-scale integration (ULSI) chip, depending on the degree of integration. A field-programmable gate array (FPGA) programmed after fabrication of the LSI chip, or a reconfigurable logic device in which interconnection relationships inside the LSI chip may be reconfigured or in which circuit demarcations inside the LSI chip may be set up, may also be used for the same purpose.

Furthermore, the function or operation of all or part of a unit, device, or part of a device may also be executed by software processing. In this case, the software is recorded onto a non-transitory recording medium, such as one or multiple ROM modules, optical discs, or hard disk drives, and when the software is executed by a processor, the software causes the processor and peripheral devices to execute specific functions in software. A system or device may also be equipped with one or multiple non-transitory recording media on which the software is recorded, a processor, and necessary hardware devices, such as an interface, for example.

The present disclosure is broadly applicable to apparatus such as an apparatus that generates an image of cells being cultivated or a mass of cells such as an embryo, for example, and is effective when imaging an object inside an incubator.

What is claimed is:

1. An image generating apparatus that generates an image of a translucent material, comprising:
    a first light source;
    a second light source positioned a certain distance away from the first light source;
    an image sensor on which the material is disposed;
    a mask including a light-transmitting part that transmits light from the first light source and the second light source, and a light-blocking part that blocks the light, the mask being positioned between the image sensor, and the first light source and the second light source; and
    a processing circuit, wherein
    the image sensor
    acquires a first image of the material when illuminated by the first light source,
    acquires a second image of the material when illuminated by the second light source,
    the image sensor includes a first pixel region and a second pixel region,
    the light-blocking part is positioned between the first pixel region and the first light source,
    the light-blocking part is positioned between the second pixel region and the second light source, and
    the processing circuit
    uses first pixel information corresponding to the first pixel region in the first image and second pixel information corresponding to the second pixel region in the second image to generate a third image.

2. The image generating apparatus according to claim 1, wherein
    the material is an embryo including a cell, and
    the processing circuit
    specifies a region having a brightness equal to or greater than a first threshold value in the third image as a region where the cell is positioned.

3. The image generating apparatus according to claim 2, wherein
    the processing circuit
    uses the third image and the region where the cell is positioned to generate a fourth image emphasizing the region where the cell is positioned.

4. The image generating apparatus according to claim 1, wherein
    the material is an embryo including multiple cells, and
    the processing circuit
    (a1) extracts multiple cell regions having a brightness equal to or greater than a first threshold value in the third image,
    (a2) determines whether or not the brightness of each of the multiple cells regions is within a second range, and
    (a3) outputs the determination result.

5. The image generating apparatus according to claim 4, wherein
the processing circuit
in (a3),
outputs a determination result indicating that the multiple cells are normal in a case in which the brightness of each of the multiple cell regions is within the second region, and
outputs a determination result indicating that the multiple cells are abnormal in a case in which the brightness of each of the multiple cell regions is outside the second region.

6. The image generating apparatus according to claim 1, wherein
the material is an embryo including a cell, and
the processing circuit
(b1) extracts a cell region having a brightness equal to or greater than a first threshold value in the third image, and
(b2) computes a density of the cell on a basis of the brightness of the cell region.

7. An image generating method that generates an image of a translucent material using
a first light source,
a second light source positioned a certain distance away from the first light source,
an image sensor on which the material is disposed, and
a mask including a light-transmitting part that transmits light from the first light source and the second light source, and a light-blocking part that blocks the light, the mask being positioned between the image sensor, and the first light source and the second light source,
the image sensor including a first pixel region and a second pixel region,
the light-blocking part being positioned between the first pixel region and the first light source, and
the light-blocking part being positioned between the second pixel region and the second light source,
the image generating method comprising:
(a) acquiring, with the image sensor, a first image of the material when illuminated by the first light source;
(b) acquiring, with the image sensor, a second image of the material when illuminated by the second light source; and
(c) using first pixel information corresponding to the first pixel region in the first image and second pixel information corresponding to the second pixel region in the second image to generate a third image.

8. An image generating apparatus, comprising:
a light source including a first light source and a second light source;
an image sensor, including first pixels and second pixels;
a mask having a transmission part and a shield including a first shield and a second shield, the mask being located between the light source and the image sensor; and
a processing circuit, wherein
the first shield is located on a light path for first light that is emitted from the first light source and travels straight from the first light source to the first pixels,
the second shield is located on a light path for second light that is emitted from the second light source and travels straight from the second light source to the second pixels,
the processing circuit generates an image of an object provided between the mask and the image sensor using information detected by the first pixels during a first time period when the first light source emits light and information detected by the second pixels during a second time period when the second light source emits light, and
the first time period and the second time period are not overlapped.

* * * * *